(12) United States Patent
Pinto

(10) Patent No.: US 12,423,117 B2
(45) Date of Patent: Sep. 23, 2025

(54) PLUGIN FRAMEWORK MECHANISM TO MANAGE COMPUTATIONAL STORAGE DEVICES

(71) Applicant: Samsung Electronics Co., Ltd., Suwon-si (KR)

(72) Inventor: Oscar P. Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 240 days.

(21) Appl. No.: 17/502,023

(22) Filed: Oct. 14, 2021

(65) Prior Publication Data
US 2022/0391224 A1 Dec. 8, 2022

Related U.S. Application Data

(60) Provisional application No. 63/196,667, filed on Jun. 3, 2021.

(51) Int. Cl.
*G06F 9/445* (2018.01)
*G06F 13/40* (2006.01)
*H04L 67/51* (2022.01)

(52) U.S. Cl.
CPC ...... *G06F 9/44526* (2013.01); *G06F 13/4022* (2013.01); *H04L 67/51* (2022.05)

(58) Field of Classification Search
CPC .... G06F 9/44526; G06F 13/4022; G06F 9/54; G06F 9/541; G06F 3/0614; G06F 3/0649;
(Continued)

(56) References Cited

U.S. PATENT DOCUMENTS 5,805,777 A * 9/1998 Kuchta ................. G06F 3/1203
358/1.15
6,976,255 B1 12/2005 Clark et al.
(Continued)

FOREIGN PATENT DOCUMENTS

| CN | 102929813 B | 6/2016 |
|---|---|---|
| CN | 109254873 A | 1/2019 |

(Continued)

OTHER PUBLICATIONS

Warke, Amit, et al. "Storage service orchestration with container elasticity." 2018 IEEE 4th International Conference on Collaboration and Internet Computing (CIC). IEEE, 2018. (Year: 2018).*
(Continued)

*Primary Examiner* — Matthew J Brophy
(74) *Attorney, Agent, or Firm* — Renaissance IP Law Group LLP

(57) ABSTRACT

A system is disclosed. The system may include a processor, a storage device, and aa computational device. A plugin may be associated with a service on the computational device. A framework may be implemented in software and configured to be executed on the processor. The framework may include a receiver to receive a service request from an application configured to be executed on the processor and a service response from the plugin. The service request may identify a service requested by the application. The framework may also include a plugin selector to select the plugin based at least in part on the service. The framework may also include a transmitter to deliver the service request to the plugin and the service response to the application. The application may be agnostic to the plugin and the computational device.

23 Claims, 20 Drawing Sheets

(58) Field of Classification Search
CPC .... G06F 3/0683; G06F 3/0659; G06F 9/3877; G06F 13/42; H04L 67/51
See application file for complete search history.

(56) References Cited

U.S. PATENT DOCUMENTS

| | | | |
|---|---|---|---|
| 7,315,807 B1* | 1/2008 | Lavallee | H04L 41/145 703/22 |
| 7,433,931 B2 | 10/2008 | Richoux | |
| 7,801,931 B2* | 9/2010 | Tunar | G06F 3/0689 707/827 |
| 7,937,703 B2 | 5/2011 | Bethea et al. | |
| 8,381,004 B2 | 2/2013 | Elnozahy et al. | |
| 8,615,570 B2 | 12/2013 | Brewis et al. | |
| 8,726,299 B1* | 5/2014 | Bromley | G06F 9/44526 719/328 |
| 8,904,072 B2 | 12/2014 | Lee | |
| 8,943,504 B2 | 1/2015 | Vijayarajan et al. | |
| 9,203,627 B2 | 12/2015 | Edstrom et al. | |
| 9,398,016 B1 | 7/2016 | Chakraborty et al. | |
| 9,406,082 B2 | 8/2016 | Smedberg et al. | |
| 9,596,135 B1* | 3/2017 | Thomas | H04L 41/0806 |
| 9,626,120 B1 | 4/2017 | Jia et al. | |
| 10,162,793 B1 | 12/2018 | Bshara et al. | |
| 10,303,382 B1* | 5/2019 | Chu | G06F 3/0685 |
| 10,359,953 B2 | 7/2019 | Cargnini et al. | |
| 10,394,746 B2 | 8/2019 | Kachare et al. | |
| 10,404,811 B2 | 9/2019 | Ly et al. | |
| 10,412,187 B2 | 9/2019 | Busayarat et al. | |
| 10,476,936 B1* | 11/2019 | Retnakumari | G06F 16/185 |
| 10,521,114 B2* | 12/2019 | Thomas | G06F 3/0607 |
| 10,621,114 B1 | 4/2020 | Bshara et al. | |
| 10,637,962 B2 | 4/2020 | Gay et al. | |
| 10,771,340 B2 | 9/2020 | Ballapuram | |
| 10,795,726 B2 | 10/2020 | Fujii et al. | |
| 10,802,753 B2 | 10/2020 | Kabra et al. | |
| 10,838,905 B2 | 11/2020 | Zou et al. | |
| 10,846,096 B1 | 11/2020 | Chung et al. | |
| 10,860,511 B1 | 12/2020 | Thompson et al. | |
| 10,877,750 B1 | 12/2020 | Connolly et al. | |
| 11,294,576 B2 | 4/2022 | Khan et al. | |
| 11,334,382 B2 | 5/2022 | Bernat et al. | |
| 11,474,974 B2 | 10/2022 | Lutz et al. | |
| 11,507,298 B2 | 11/2022 | Yang et al. | |
| 11,630,921 B2 | 4/2023 | Sinha et al. | |
| 11,687,498 B2* | 6/2023 | Trika | G06F 16/1834 709/223 |
| 2003/0093572 A1* | 5/2003 | Laux | G06F 9/5055 709/250 |
| 2004/0220918 A1 | 11/2004 | Scriffignano et al. | |
| 2005/0132341 A1* | 6/2005 | Lanzatella | G06F 3/0664 717/136 |
| 2007/0276924 A1* | 11/2007 | Newton | H04N 21/443 709/219 |
| 2008/0004887 A1* | 1/2008 | Brunswig | G06F 9/5027 719/320 |
| 2008/0279161 A1 | 11/2008 | Stirbu et al. | |
| 2011/0066676 A1 | 3/2011 | Kleyzit et al. | |
| 2011/0185295 A1 | 7/2011 | Kashida | |
| 2012/0079172 A1 | 3/2012 | Yoshida | |
| 2012/0152576 A1 | 6/2012 | Bassinger et al. | |
| 2012/0162234 A1 | 6/2012 | Blinzer et al. | |
| 2013/0173662 A1 | 7/2013 | Kaplinger et al. | |
| 2014/0143778 A1* | 5/2014 | Gopal | G06F 9/45533 718/1 |
| 2014/0310332 A1* | 10/2014 | Huang | H04L 67/10 709/203 |
| 2015/0319246 A1 | 11/2015 | Ishizaka | |
| 2016/0012128 A1* | 1/2016 | Siebler | G06F 9/545 707/769 |
| 2016/0054931 A1 | 2/2016 | Romanovsky et al. | |
| 2016/0328344 A1* | 11/2016 | Jose | G06F 9/4411 |
| 2017/0249088 A1* | 8/2017 | Thomas | G06F 3/0617 |
| 2018/0063145 A1 | 3/2018 | Cayton et al. | |
| 2018/0352038 A1* | 12/2018 | Sathyanarayana | H04L 69/22 |
| 2019/0037280 A1 | 1/2019 | Yang et al. | |
| 2019/0349281 A1 | 11/2019 | Oztaskent et al. | |
| 2020/0012439 A1 | 1/2020 | Khan et al. | |
| 2020/0050480 A1 | 2/2020 | Cao et al. | |
| 2020/0057578 A1 | 2/2020 | Benisty et al. | |
| 2020/0081640 A1 | 3/2020 | Enz et al. | |
| 2020/0117517 A1 | 4/2020 | Costa et al. | |
| 2020/0167098 A1 | 5/2020 | Shah et al. | |
| 2020/0183582 A1 | 6/2020 | Kachare et al. | |
| 2020/0192592 A1 | 6/2020 | Song et al. | |
| 2020/0201575 A1* | 6/2020 | Mizrahi | G06F 13/4295 |
| 2020/0301898 A1 | 9/2020 | Samynathan et al. | |
| 2020/0310694 A1 | 10/2020 | Gao et al. | |
| 2020/0379781 A1* | 12/2020 | Rachapudi | G06F 8/30 |
| 2021/0026560 A1 | 1/2021 | Pillai et al. | |
| 2021/0247922 A1 | 8/2021 | Song et al. | |
| 2021/0303159 A1 | 9/2021 | Ke | |
| 2021/0377117 A1 | 12/2021 | Kanevsky et al. | |
| 2022/0058137 A1 | 2/2022 | Xu et al. | |
| 2022/0188028 A1 | 6/2022 | Mesnier et al. | |
| 2022/0236911 A1 | 7/2022 | Jones | |
| 2022/0295255 A1 | 9/2022 | Karampatsis et al. | |
| 2023/0244499 A1* | 8/2023 | Gupta | G06F 9/546 717/101 |

FOREIGN PATENT DOCUMENTS

| | | |
|---|---|---|
| EP | 3964956 A1 | 3/2022 |
| KR | 20120071060 A | 7/2012 |
| KR | 20140001970 A | 1/2014 |
| KR | 20170121661 A | 11/2017 |
| KR | 20180106822 A | 10/2018 |
| KR | 20200068564 A | 6/2020 |
| TW | 200622673 A | 7/2006 |
| TW | 201214288 A | 4/2012 |
| TW | 201324352 A | 6/2013 |
| TW | 202102976 A | 1/2021 |
| WO | 2002097610 A1 | 12/2002 |

OTHER PUBLICATIONS

Office Action for U.S. Appl. No. 17/234,780, mailed Jan. 5, 2023.
Anandan, Sabby et al., "Industry Paper: Spring XD—A Modular Distributed Stream and Batch Processing System," DEBS '15: Proceedings of the 9th ACM International Conference on Distributed Event-Based Systems, Jun. 2015, pp. 217-225.
Carbone, Paris et al., "Apache Flink™: Stream and Batch Processing in a Single Engine," Bulletin of the IEEE Computer Society Technical Committee on Data Engineering, vol. 36, No. 4, 2015, pp. 28-38.
European Extended Search Report for Application No. 21190626.8, mailed Jan. 28, 2022.
European Extended Search Report for Application No. 21212137.0, mailed Apr. 28, 2022.
Fisher, Mark et al., "Spring XD Guide", 1.3.3.Build-Snapshot, 2013, 400 pages.
NVM Express, Inc., "NVM Express TM over Fabrics Revision 1.1," Oct. 22, 2019, pp. 1-83, XP055877791, Retrieved from the Internet: URL:https://nvmexpress.org/wp-content/uploads/NVMe-over-Fabrics-1.1-2019.10.22-Ratified.pdf, retrieved on Jan. 11, 2022.
Office Action for U.S. Appl. No. 17/495,810, mailed Oct. 17, 2022.
Torabzadehkashi, Mahdi, et al. "Computational Storage: An Efficient and Scalable Platform for Big Data and HPC Applications," Journal of Big Data, vol. 6, No. 1, 2019, pp. 1-29.
Bates, Stephen, "Accelerating RocksDB with Eideticom's NoLoad NVMe-based Computational Storage Processor," Storage Developer Conference 2019, Sep. 2019, retrieved from the Internet: URL:https://www.snia.org/sites/defaultifiles/SDC/2019/presentations/Computational/Bates_Stephen_Accelerating_RocksDB_with_Eideticom's_NoLoad_NVMe-based_ComputationalStorage_Processor.pdf [retrieved on Feb. 8, 2024], 16 pages.
Chambers, Bill et al., "Spark, the Definitive Guide: Big Data Processing Made Simple", first 400 pages, Feb. 2018, retrieved from the Internet: URL:https://analyticsdata24.files.wordpress.com/

(56) References Cited

OTHER PUBLICATIONS

2020/02/spark-the-definitive-guide40www.bigdatabugs.com_.pdf [retrieved on Jan. 18, 2024], 400 pages.

European Summons to Oral Proceedings for Application No. 21190626.8, mailed Feb. 15, 2024.

European Summons to Oral Proceedings for Application No. 21190952.8, mailed Jan. 25, 2024.

Gounaris, Anastasios et al, "Dynamic Configuration of Partitioning in Spark Applications," IEEE Transactions on Parallel and Distributed Systems, vol. 28, No. 7, Jul. 2017, [retrieved on Jun. 10, 2017], pp. 1891-1904.

Molgaard, Jason, "A Simple Approach to Implementing Computational Storage," Storage Developer Conference 2019, Sep. 2019, retrieved from the Internet: URL:https://www.snia.org/sites/defaultifiles/SDC/2019/presentations/Computational/Molgaard_Jason_A_Simple_Approach_to_Implementing_Computational_Storage.pdf [retrieved on Feb. 8, 2024], 25 pages.

Prasaad, Guna et al., "Improving High Contention OLTP Performance via Transaction Scheduling", arXiv.org, Oct. 2018, retrieved from the Internet: URL:https://arxiv.org/pdf/1810.01997.pdf [retrieved on Jan. 17, 2024], 15 pages.

Sabiu, Habib Ado, "Performance Evaluation of Job Scheduling and Resource Allocation in Apache Spark," Jul. 2018, retrieved from the Internet: URL:https://harvest.usask.ca/server/api/core/bitstreams/9654d97a-5217-486d-b8ae-df305acfc5b8/content [retrieved on Jan. 17, 2024], 104 pages.

Shadley, Scott et al., "What Happens When Compute Meets Storage?," Sep. 2019, retrieved from the Internet: URL:https://www.snia.org/sites/defaultifiles/SDC/2019/presentations/Computational/Shadley_Scott_Adams_Nick_What_Happens_when_Compute_meets_Storage_Computational_Storage_TWG.pdf [retrieved on Jan. 13, 2022], 28 pages.

SNIAVideo: "What Happens when Compute Meets Storage (SDC 2019)," Oct. 2019, retrieved from the Internet: URL:https://www.youtube.com/watch?=45nhck3tN4U [retrieved on Feb. 8, 2024], 2 pages.

Tang, Shanjiang et al., "A Survey on Spark Ecosystem for Big Data Processing," arxiv.org, Nov. 2018, 21 pages.

Wikipedia, "Message Broker," Jul. 2020, retrieved from the Internet: URL:https://en.wikipedia.org/w/index.php?title=Message_broker&Oldid=966520924 [retrieved on Jan. 18, 2024], 3 pages.

Final Office Action for U.S. Appl. No. 17/234,780, mailed Aug. 17, 2023.

Office Action for U.S. Appl. No. 17/234,780, mailed Dec. 22, 2023.

Office Action for U.S. Appl. No. 17/359,495, mailed Dec. 7, 2023.

Office Action for U.S. Appl. No. 17/495,810, mailed Oct. 5, 2023.

Final Office Action for U.S. Appl. No. 17/495,810, mailed May 20, 2024.

Final Office Action for U.S. Appl. No. 17/234,780, mailed Jul. 5, 2024.

Notice of Allowance for U.S. Appl. No. 17/495,810, mailed Aug. 22, 2024.

Office Action for U.S. Appl. No. 17/359,495, mailed Aug. 12, 2024.

Castellani, Angelo P. et al., "WebIoT: A Web Application Framework for the Internet of Things," WCNC 2012 Workshop on Internet of Things Enabling Technologies, Embracing Machine-to-Machine Communications and Beyond, 2012, pp. 202-207.

European Office Action for Application No. 22174076.4, mailed Jul. 8, 2024.

Kerdoudi, Mohamed Lamine et al., "Recovering Software Architecture Product Lines," 2019 24th International Conference on Engineering of Complex Computer Systems (ICECCS), 2019, pp. 226-235.

Corrected Notice of Allowability for U.S. Appl. No. 17/495,810, mailed Dec. 11, 2024.

Corrected Notice of Allowability for U.S. Appl. No. 17/495,810, mailed Oct. 25, 2024.

Corrected Notice of Allowability for U.S. Appl. No. 17/495,810, mailed Oct. 7, 2024.

Office Action for U.S. Appl. No. 17/234,780, mailed Dec. 19, 2024.

European Office Action for Application No. 21190952.8, mailed Oct. 18, 2024.

European Office Action for Application No. 21212137.0, mailed Oct. 25, 2024.

Li, Yonghui et al., "Architecture and Analysis of a Dynamically-Scheduled Real-Time Memory Controller," Real-Time Systems, Jul. 2015, vol. 52, pp. 675-729.

Li, Yonghui, "Design and Formal Analysis of Real-Time Memory Controllers," Phd Thesis 1 (Research TU/e/Graduation TU/e), Electrical Engineering, Sep. 2016, 207 pages.

Mutlu, Onur et al., "Parallelism-Aware Batch Scheduling: Enhancing both Performance and Fairness of Shared DRAM Systems," International Symposium on Computer Architecture, ACM SIGARCH Computer Architecture News, 2008, vol. 36, Issue 3, pp. 63-74.

Prieto, Pablo et al., "CMP Off-Chip Bandwidth Scheduling Guided by Instruction Criticality," ICS '13: Proceedings of the 27th International ACM Conference on International Conference on Supercomputing, Jun. 2013, pp. 379-388.

Zhou, Ping et al., "Throughput Enhancement for Phase Change Memories," IEEE Transactions on Computers, vol. 63, No. 8, Aug. 2014, pp. 2080-2093.

European Summons to Oral Proceedings for Application No. 21190952.8, mailed Mar. 26, 2025.

Notice of Allowance for U.S. Appl. No. 17/359,495, mailed Mar. 10, 2025.

Notice of Allowance for U.S. Appl. No. 17/234,780, mailed Apr. 15, 2025.

\* cited by examiner

PLUGIN FRAMEWORK MECHANISM TO MANAGE COMPUTATIONAL STORAGE DEVICES

RELATED APPLICATION DATA

This application claims the benefit of U.S. Provisional Patent Application Ser. No. 63/196,667, filed Jun. 3, 2021, which is incorporated by reference herein for all purposes.

This application is related to U.S. patent application Ser. No. 17/359,495, filed Jun. 25, 2021, which claims the benefit of U.S. Provisional Patent Application Ser. No. 63/073,922, filed Sep. 2, 2020, U.S. Provisional Patent Application Ser. No. 63/141,970, filed Jan. 26, 2021, U.S. Provisional Patent Application Ser. No. 63/142,485, filed Jan. 27, 2021, and U.S. Provisional Patent Application Ser. No. 63/144,469, filed Feb. 1, 2021, all of which are incorporated by reference herein for all purposes.

This application is related to U.S. patent application Ser. No. 17/234,780, filed Apr. 19, 2021, which claims the benefit of U.S. Provisional Patent Application Ser. No. 63/073,922, filed Sep. 2, 2020, and U.S. Provisional Patent Application Ser. No. 63/144,469, filed Feb. 1, 2021, all of which are incorporated by reference herein for all purposes.

FIELD

The disclosure relates generally to storage devices, and more particularly to managing communication with storage devices without learning about the specifics of the storage devices.

BACKGROUND

When a host processor sends a request to a storage device—whether to read data, write data, or for some near-storage processor to process data—the host needs to know particulars about the storage device. For example, the host needs to know which particular storage device is to execute the request. This makes the host dependent on the availability of the storage device: if the storage device is removed, or if the application being executed by the host is moved to another host, the application might fail to execute correctly.

A need remains to support hosts using storage devices without the host having to know the specifics of the storage devices.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
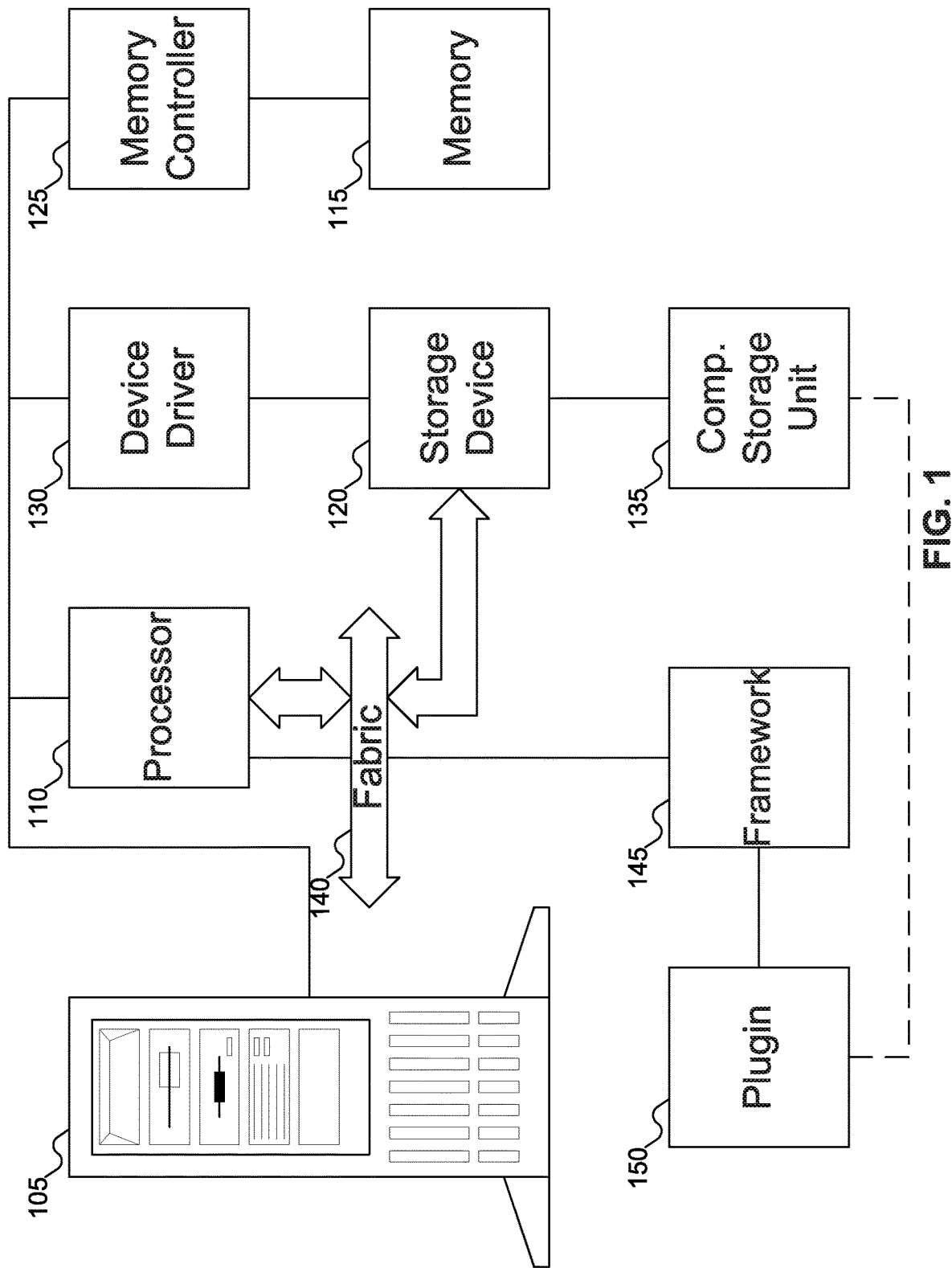
FIG. 1 shows a system including a computational storage unit that supports plugins, according to embodiments of the disclosure.

Embodiments of the disclosure include a storage device that may support a data retention period. When the storage device receives a write request, the storage device may determine the retention period for the data. This information may be used to select where (and/or how) to program the data onto the storage device.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Many applications issue requests with a particular storage device intended to execute the request. This design may tie the application to the storage device. For example, if the storage device is removed from the system, or the application is moved to another host, the application may fail to execute correctly. This problem may occur even if the data on the storage device is moved with the application: for example, if the application assumes a particular compression or encryption algorithm is applied to the data, a change in the storage device may result in a different compression or encryption algorithm being used. As a result, the application may make assumptions about the storage device that might not be true forever.

Embodiments of the disclosure support a framework for plugins. A plugin may support a feature of one or more storage devices, and a single storage device may use one or more plugins for various features of the storage device. For example, a storage device may include a plugin to manage reading data from and/or writing data to the storage device, and another plugin to permit an application to execute a service offered by the storage device. These plugins may register with a framework.

When an application wants to issue a request for a feature of a storage device, the request may be issued using an Application Programming Interface (API) without identifying a particular storage device. The API may interface with the framework to determine what storage devices are available, and what features are offered by those storage devices. An appropriate plugin may be used to forward the request to an appropriate storage device.

FIG. 1 shows a system including a computational storage unit that supports plugins, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130.

Storage device 120 may be associated with computational storage unit 135. As discussed below with reference to FIGS. 3A-3D, computational storage unit 135 may be part of storage device 120, or it may be separate from storage device 120. The phrase "associated with" is intended to cover both a storage device that includes a computational storage unit and a storage device that is paired with a computational storage unit that is not part of the storage device itself. In other words, a storage device and a computational storage unit may be said to be "paired" when they are physically separate devices but are connected in a manner that enables them to communicate with each other.

In addition, the connection between the storage device and the paired computational storage unit might enable the two devices to communicate, but might not enable one (or both) devices to work with a different partner: that is, the storage device might not be able to communicate with another computational storage unit, and/or the computational storage unit might not be able to communicate with another storage device. For example, the storage device and the paired computational storage unit might be connected serially (in either order) to the fabric, enabling the computational storage unit to access information from the storage device in a manner another computational storage unit might not be able to achieve.

Processor 105 and storage device 120 are shown as connecting to fabric 140. Fabric 140 is intended to represent any fabric along which information may be passed. Fabric 140 may include fabrics that may be internal to machine 105, and which may use interfaces such as Peripheral Component Interconnect Express (PCIe), Serial AT Attachment (SATA), Small Computer Systems Interface (SCSI), among others. Fabric 140 may also include fabrics that may be external to machine 105, and which may use interfaces such as Ethernet, InfiniBand, or Fibre Channel, among others. In addition, fabric 140 may support one or more protocols, such as Non-Volatile Memory (NVM) Express (NVMe), NVMe over Fabrics (NVMe-oF), or Simple Service Discovery Protocol (SSDP), among others. Thus, fabric 140 may be thought of as encompassing both internal and external networking connections, over which commands may be sent, either directly or indirectly, to storage device 120 (and more particularly, the computational storage unit associated with storage device 120).

To aid in abstracting away the details of storage device 120 and/or computational storage unit 135, machine 105 may also include framework 145 and plugin 150. Framework 145 may manage the registration, deregistration, and use of plugins such as plugin 150. Plugin 150 may communicate with computational storage unit 135, enabling an application to access a service offered by storage device 120 and/or computational storage unit 135 with the application having to know the particulars of storage device 120 and/or computational storage unit 135. That is, the application may issue a request for a particular service. Framework 145 may identify plugin 150 as being associated with storage device 120 and/or computational storage unit 135, and is capable of carrying out the service requested by the application. Framework 145 may then deliver the service request to plugin 150, which may then interface with storage device 120 and/or computational storage unit 135 to have the requested service executed. Plugin 150 may then receive a result of the service execution from storage device 120 and/or computational service unit 135 and return that result to framework 145, which may return the result to the application. Framework 145 and plugin 150 are discussed further below.

While FIG. 1 shows one storage device 120, one computational storage unit 135, and one plugin 150, there may be any number of storage devices, computational storage units, and plugins in machine 105. For example, plugin 150, like device driver 130, may support any number of storage devices 120 and/or computational storage units 135. In addition, as discussed below with reference to FIG. 7, (single) computational storage unit 135 may be associated with two (or more) plugins 150.

In addition, in some embodiments of the disclosure, plugin 150 may be offer a host level abstraction. An application may have been originally implemented on a system that includes some particular functionality: for example, storage device 120 may support compression and/or encryption of data stored thereon. If the application is ported to another system, or if storage device 120 and/or computational storage unit 135 are replaced with another storage device and/or computational storage unit, the storage device/computational storage unit with which the application now interfaces might no longer implement the service offered the previous storage device or computational storage unit. In such situations, plugin 150 may permit processor 110 to perform the service previously performed by storage device 120 and/or computational storage unit 135. In this manner, the application may continue to function despite the fact that the hardware currently supporting the application may not be capable of carrying of the specific services. This approach avoids the need for the application to be modified simply because it is ported to a new machine or the machine's hardware is modified. This host level abstraction plugin may therefore process a service request into commands (one or more) that may be executed by processor 110.

While FIG. 1 uses the generic term "storage device", embodiments of the disclosure may include any storage device formats that may benefit from the use of data quality metrics, examples of which may include hard disk drives and Solid State Drives (SSDs). Any reference to "SSD" below should be understood to include such other embodiments of the disclosure. In addition, while the discussion above (and below) focuses on storage device 120 as being associated with a computational storage unit, embodiments of the disclosure may extend to devices other than storage devices that may include or be associated with a computational storage unit. Any reference to "storage device" above (and below) may be understood as also encompassing other devices that might be associated with a computational storage unit.

Figure 2:
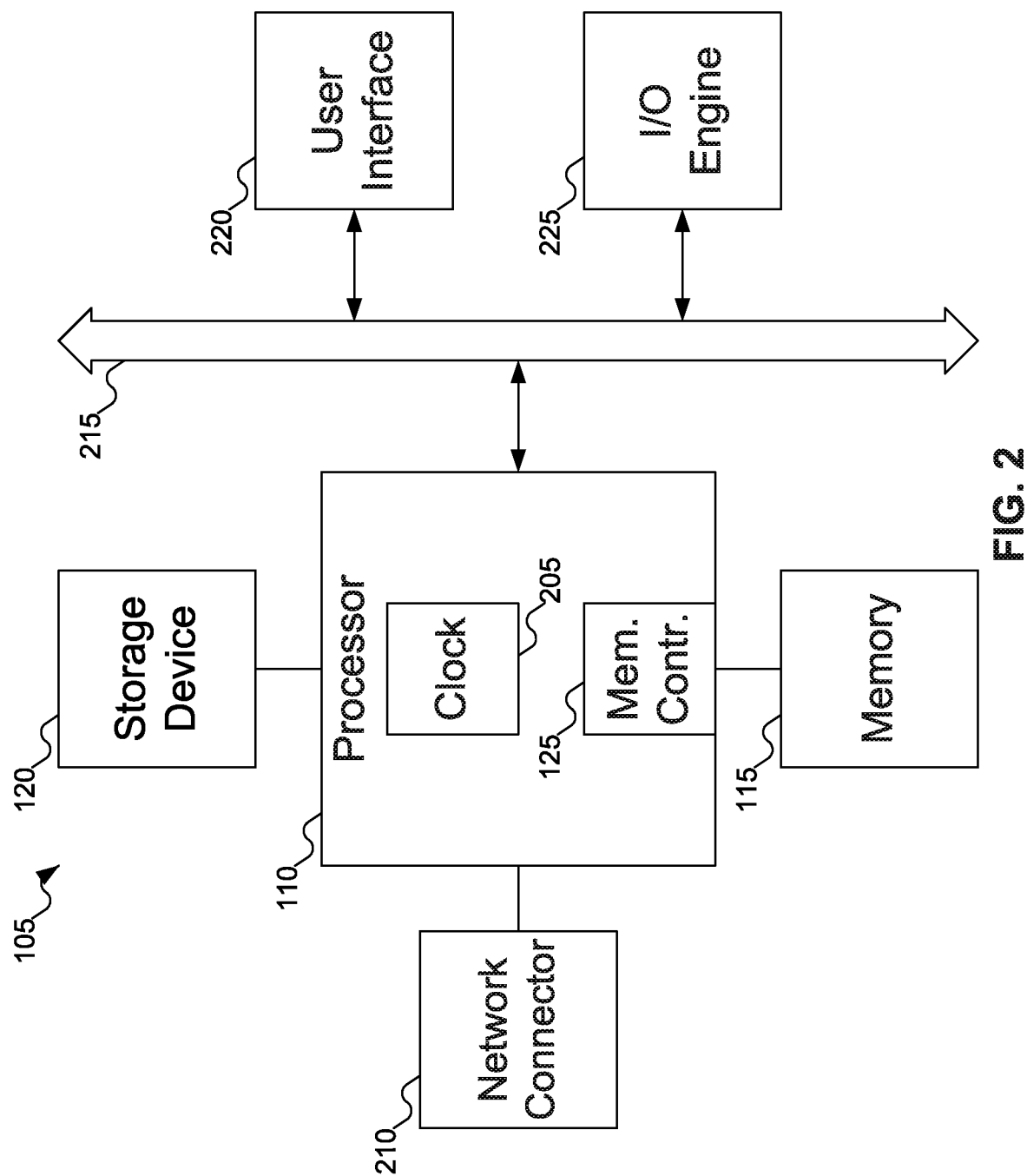
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
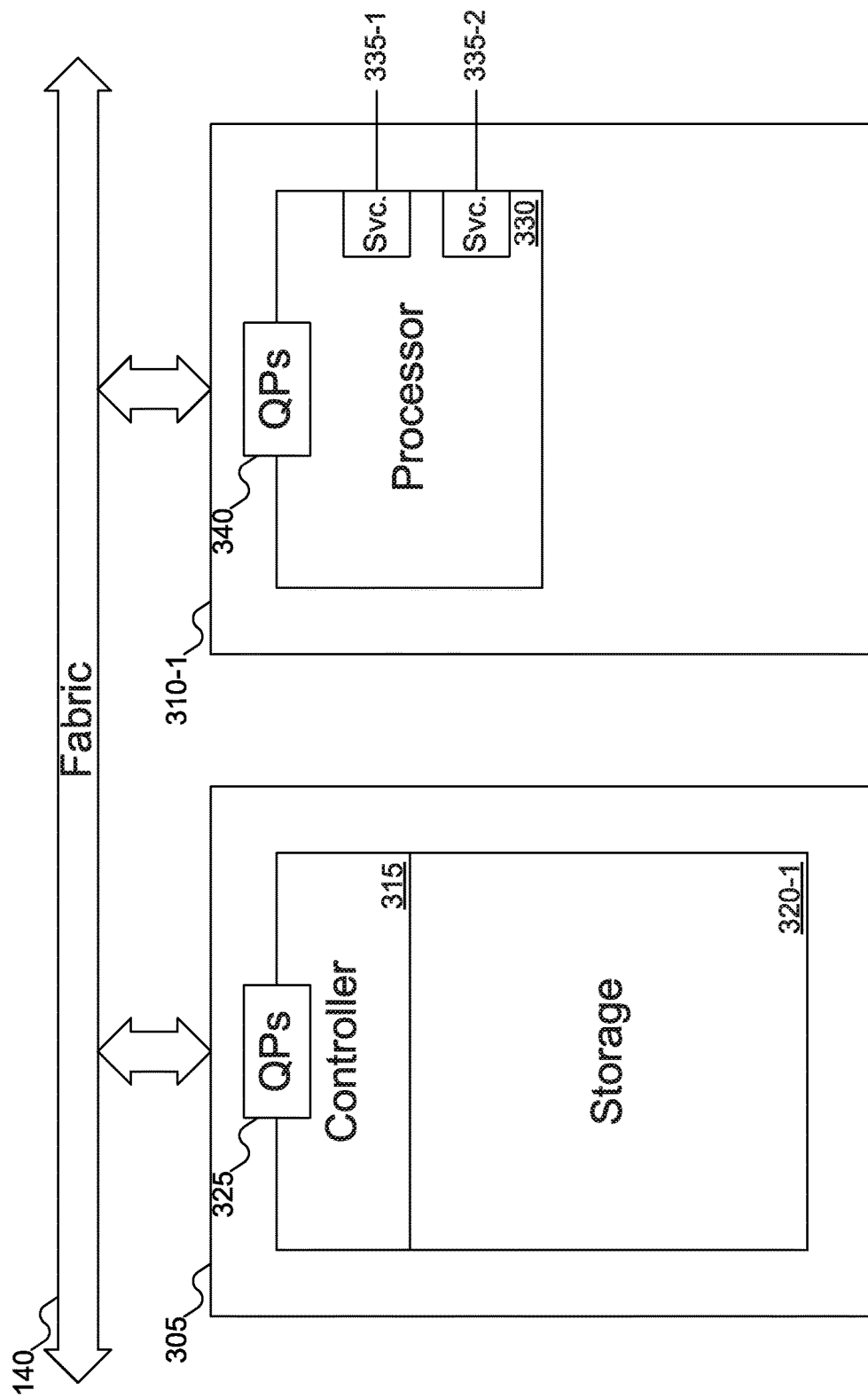
FIG. 3A shows a first example arrangement of a computational storage unit that may be associated with the storage device of FIG. 1, according to embodiments of the disclosure.

FIGS. 3A-3D show various arrangements of computational storage unit 135 of FIG. 1 (which may also be termed a "computational device" or "device") that may be associated with storage device 120 of FIG. 1, according to embodiments of the disclosure. In FIG. 3A, storage device 305 and computational device 310-1 are shown. Storage device 305 may include controller 315 and storage 320-1, and may be reachable across queue pairs: queue pairs 325 may be used both for management of storage device 305 and to control I/O of storage device 305.

Computational device 310-1 may be paired with storage device 305. Computational device 310-1 may include any number (one or more) processors 330, which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Computational device 310-1 may be reachable across queue pairs 340, which may be used for both management of computational device 310-1 and/or to control I/O of computational device 310-1

Processor(s) 330 may be thought of as near-storage processing: that is, processing that is closer to storage device 305 than processor 110 of FIG. 1. Because processor(s) 330 are closer to storage device 305, processor(s) 330 may be able to execute commands on data stored in storage device 305 more quickly than for processor 110 of FIG. 1 to execute such commands. While not shown in FIG. 3A, processor(s) 330 may have associated memory which may be used for local execution of commands on data stored in storage device 305. This associated memory may include local memory similar to memory 115 of FIG. 1, on-chip memory (which may be faster than memory such as memory 115, but perhaps more expensive to produce), or both.

While FIG. 3A shows storage device 305 and computational device 310-1 as being separately reachable across fabric 140, embodiments of the disclosure may also include storage device 305 and computational device 310-1 being serially connected (as shown in FIG. 1). That is, commands directed to storage device 305 and computational device 310-1 might both be received at the same physical connection to fabric 140 and may pass through one device to reach the other. For example, if computational device 310-1 is located between storage device 305 and fabric 140, computational device 310-1 may receive commands directed to both computational device 310-1 and storage device 305: computational device 310-1 may process commands directed to computational device 310-1, and may pass commands directed to storage device 305 to storage device 305. Similarly, if storage device 305 is located between computational device 310-1 and fabric 140, storage device 305 may receive commands directed to both storage device 305 and computational device 310-1: storage device 305 may process commands directed to storage device 305 and may pass commands directed to computational device 310-1 to computational device 310-1.

Services 335-1 and 335-2 may offer a number of different functions that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also be any combination of such functions. Table 1 lists some examples of services that may be offered by processor(s) 330.

TABLE 1

| Service Types |
| --- |
| Compression |
| Encryption |
| Database filter |
| Erasure coding |
| RAID |
| Hash/CRC |
| RegEx (pattern matching) |
| Scatter Gather |
| Pipeline |

TABLE 1-continued

| Service Types |
| --- |
| Video compression |
| Data Deduplication |
| Operating System Image Loader |
| Container Image Loader |
| Berkeley packet filter (BPF) loader |
| FPGA Bitstream loader |
| Large Data Set |

Processor(s) 330 (and, indeed, computational device 310-1) may be implemented in any desired manner. Example implementations may include a local processor, such as Central Processing Unit (CPU) or some other processor, a Graphics Processing Unit (GPU), a General Purpose GPU (GPGPU), a Data Processing Unit (DPU), and a Tensor Processing Unit (TPU), among other possibilities. Processor(s) 330 may also be implemented using a Field Programmable Gate Array (FPGA) or an Application-Specific Integrated Circuit (ASIC), among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Figure 3B:
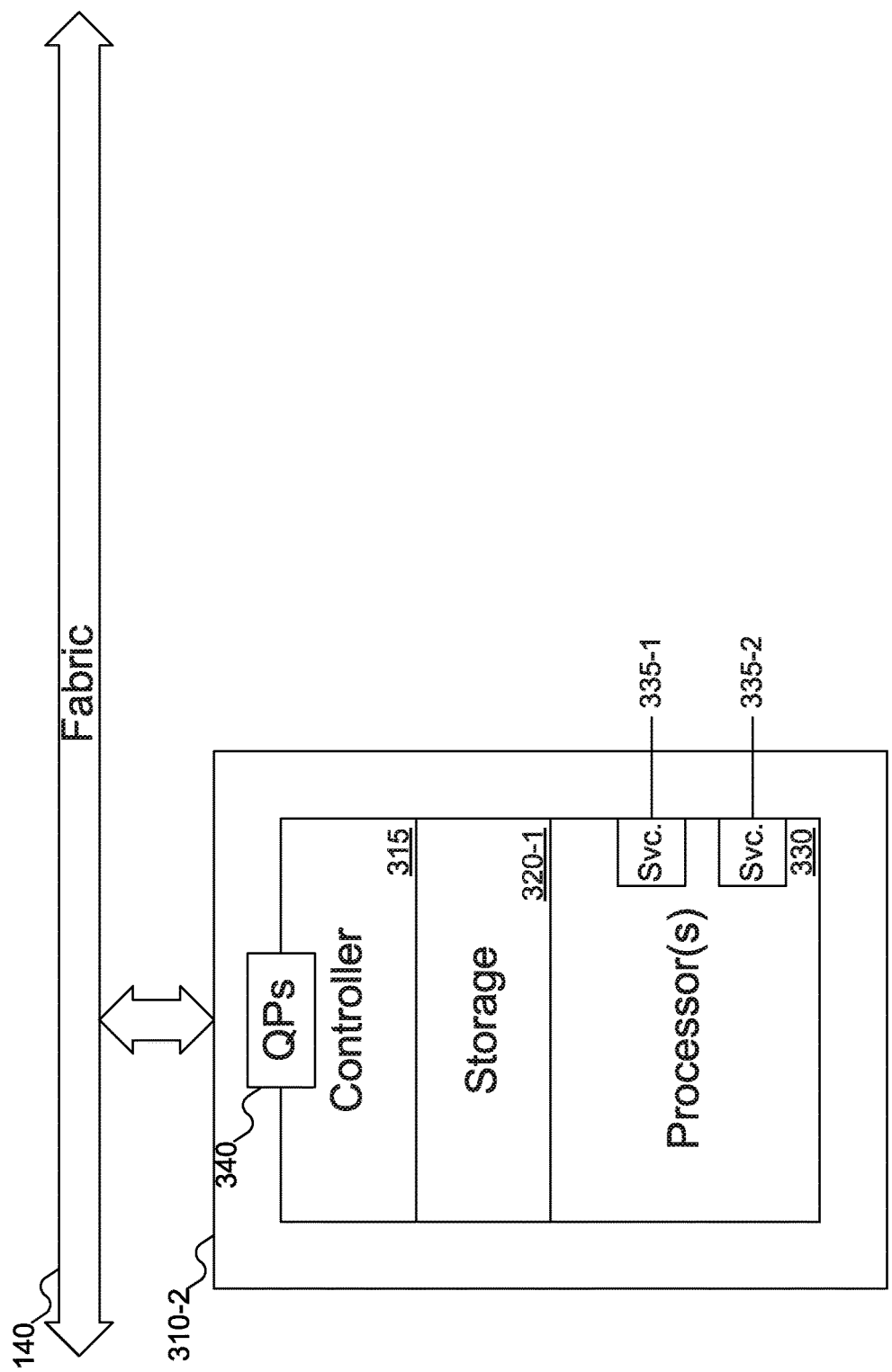
FIG. 3B shows a second example arrangement of a computational storage unit that may be associated with the storage device of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, and processor(s) 330 offering services 335-1 and 335-2. As with storage device 305 and computational device 310-1 of FIG. 3A, management and I/O commands may be received via queue pairs 340. Even though computational device 310-2 is shown as including both storage and processor(s) 330, FIG. 3B may still be thought of as including a storage device that is associated with a computational storage unit.

Figure 3C:
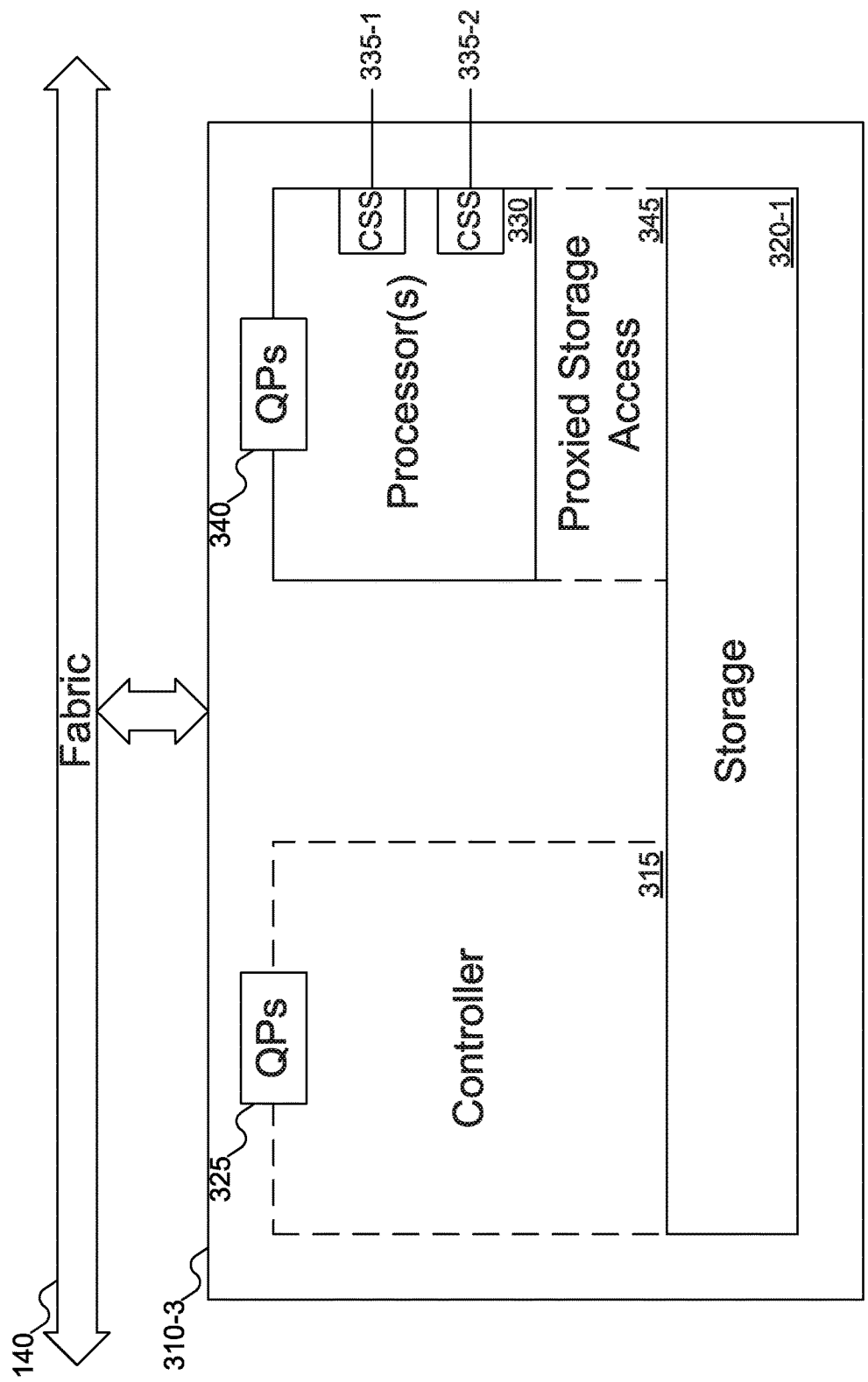
FIG. 3C shows a third example arrangement of a computational storage unit that may be associated with the storage device of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2. But even though computational device 310-3 may be thought of as a single component including controller 315, storage 320-1, and processor(s) 330 (and also being thought of as a storage device associated with a computational storage unit), unlike the implementation shown in FIG. 3B controller 315 and processor(s) 330 may each include their own queue pairs 325 and 340 (again, which may be used for management and/or I/O). By including queue pairs 325, controller 315 may offer transparent access to storage 320-1 (rather than requiring all communication to proceed through processor(s) 330).

In addition, processor(s) 330 may have proxied storage access 345 to use to access storage 320-1. Thus, instead of routing access requests through controller 315, processor(s) 330 may be able to directly access the data from storage 320-1.

In FIG. 3C, both controller 315 and proxied storage access 345 are shown with dashed lines to represent that they are optional elements, and may be omitted depending on the implementation.

Figure 3D:
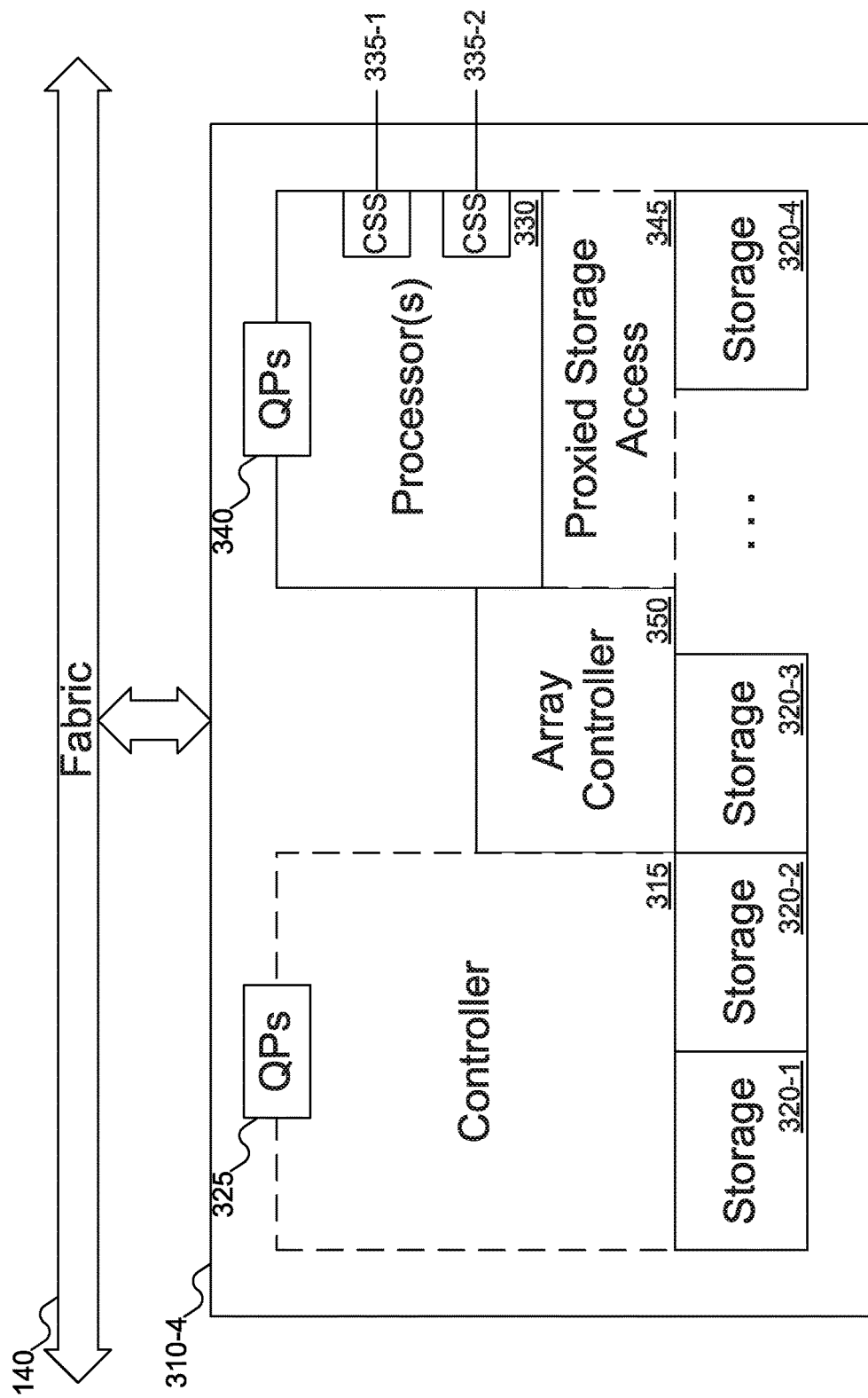
FIG. 3D shows a fourth example arrangement of a computational storage unit that may be associated with the storage device of FIG. 1, according to embodiments of the disclosure.

Finally, FIG. 3D shows yet another implementation. In FIG. 3D, computational device 310-4 is shown, which may include controller 315 and proxied storage access 345 similar to FIG. 3C. In addition, computational device 310-4 may include an array of one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 350. Array controller 350 may manage how data is stored on and retrieved from storage elements 320-1 through 320-4. For example, if storage elements 320-1 through 320-4 are implemented as some level of a Redundant Array of Independent Disks (RAID), array controller 350 may be a RAID controller. If storage elements 320-1 through 320-4 are implemented using some form of Erasure Coding, then array controller 350 may be an Erasure Coding controller.

Figure 4:
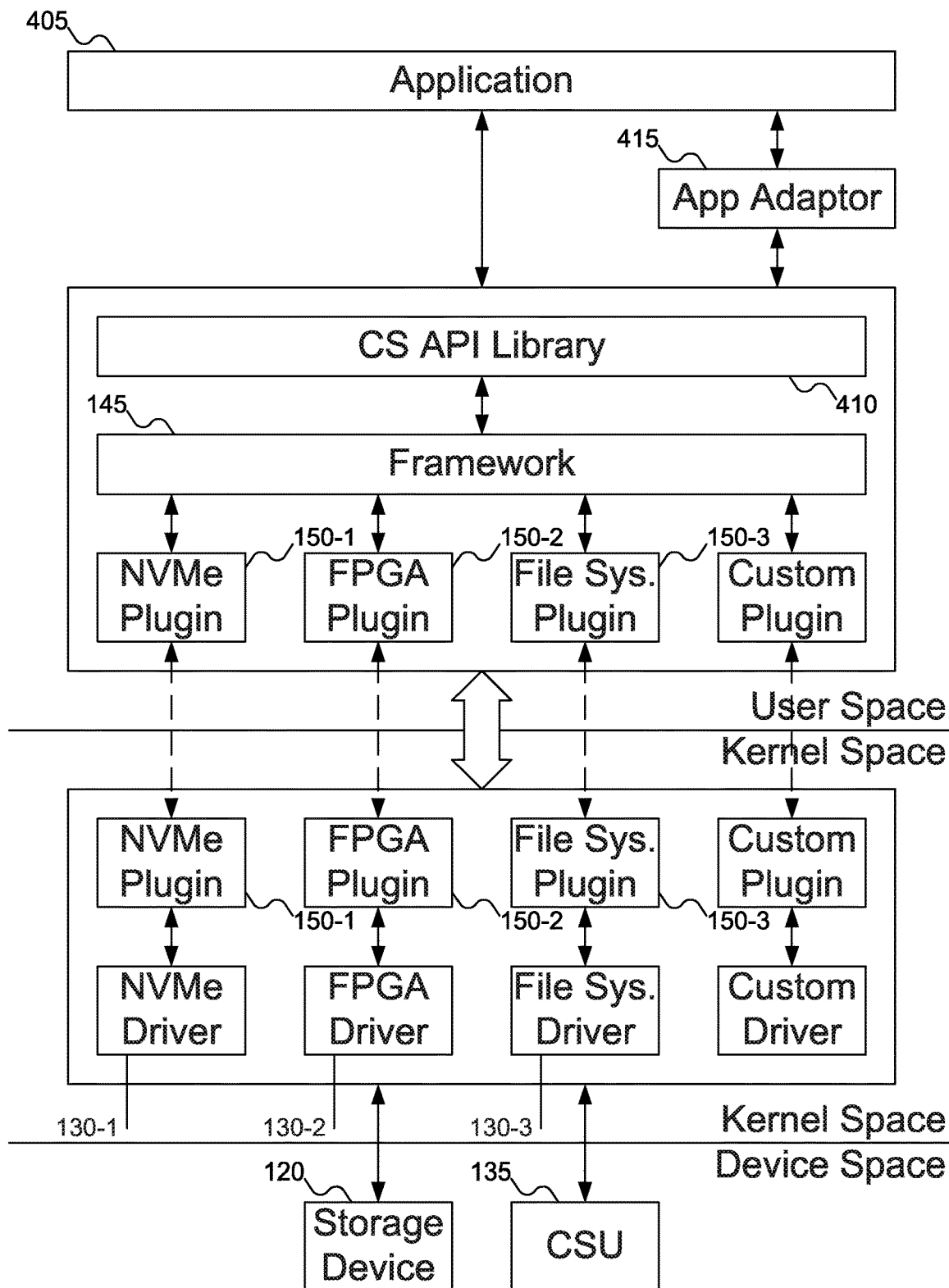
FIG. 4 shows an application running on the machine of FIG. 1 issuing requests to the computational storage unit of FIG. 1 via a framework and plugins, according to embodiments of the disclosure.

FIG. 4 shows an application running on machine 105 of FIG. 1 issuing requests to computational device 135 of FIG. 1 via framework 145 of FIG. 1 and plugin 150 of FIG. 1, according to embodiments of the disclosure. In FIG. 4, application 405 may send requests for services that are intended to be executed by storage device 120 of FIG. 1 and/or computational device 135 of FIG. 1. These service requests may include reading data from storage, writing data to storage, or executing some other service that may involve data on storage device 120 of FIG. 1, such as compression/decompression, encryption/decryption, or other processing, to name some examples.

Application 405 may send these service requests using an Application Programming Interface (API), that may be offered by Computational Service (CS) API library 410. Using an API may enable application 405 to issue service requests in a manner that is generic, without application 405 needing to know what storage devices 120 and/or computational devices 135 are available from machine 105 of FIG. 1. More specifically, application 405 may issue such service requests without needing to format the service requests in a particular manner expected by storage devices 120 and/or computational devices 135: application 405 may leave it to CS API library 410 and related elements to pass the service request to the appropriate module (such as storage device 120 or computational device 135).

But while using APIs from CS API library 410 may simplify the implementation of application 405, CS API library 410 would responsible for passing the service request to storage device 120 and/or computational device 135. While it is not necessarily difficult for CS API library 410 to know such information, CS API library 410 may need to be augmented every time a new module (be it storage device 120 or computational device 135) is implemented, so as to be able to support the use of such a module if it is added to machine 105.

By adding framework 145 and plugins 150, CS API library 410 may avoid modification every time a new module is implemented. Instead, when a new module is installed, the system administrator may register one or more plugins 150 appropriate to the module with framework 145. This approach shifts the formatting and other delivery issues from CS API library 410 to plugins 150, and only the plugins needed to support the installed modules may be registered with framework 145. Plugins 150 may receive requests in a manner that CS API library 410 may use (regardless of which plugin 150 ultimately receives the service request), and plugins 150 may handle the particulars of how the service requests is delivered to the appropriate module.

In FIG. 4, NVMe plugin 150-1, FPGA plugin 150-2, and file system plugin 150-3 are shown. NVMe plugin 150-1 may be responsible for handling service requests to be delivered to an NVMe storage device. FPGA plugin 150-2 may be responsible for handling service requests to be delivered to an FPGA. File system plugin 150-3 may be responsible for handling file system requests and converting them into a format appropriate for the storage device that may ultimately carry out the service request. File system plugin 150-3 is discussed further with reference to FIGS. 7 and 12A-12C below.

While FIG. 4 shows NVMe plugin 150-1, FPGA plugin 150-2, and file system plugin 150-3 as registered with framework 145, embodiments of the disclosure may include or omit these particular plugins as appropriate for modules included in machine 105. Embodiments of the disclosure may also include other plugins not shown in FIG. 4, as appropriate for modules included in machine 105.

If machine 105 includes more than one NVMe storage device, NVMe plugin 150-1 may be responsible for delivering service requests to all such devices. Similarly, if machine 105 includes more than one FPGA, FPGA plugin 150-2 may be responsible for delivering service requests to all such FPGAs. But in some embodiments of the disclosure, there may be more than one NVMe plugin 150-1 and/or more than one FPGA plugin 150-2 to support different NVMe storage devices and/or different FPGAs. The same concept may hold true for plugins associated with other types of modules.

One particular type of plugin not shown in FIG. 4 is an NVMe-oF plugin. But framework 145 may support an NVMe-oF plugin intended to support service requests executed by an NVMe-oF storage device. An NVMe-oF storage device may be physically remote from machine 105 of FIG. 1 (in the sense that the NVMe-oF storage device may be accessed across some sort of network, be it a local area network (LAN), a wide area network (WAN), a metropolitan area network (MAN) or a global network). But because the NVMe-oF storage device is accessible from machine 105 of FIG. 1, the NVMe-oF storage device is logically included in machine 105. Thus, the phrase "included in" and its variants, in this context, are intended to encompass both modules that are physically inside machine 105 of FIG. 1 and modules that are accessible from machine 105 of FIG. 1, even if not physically inside machine 105 of FIG. 1.

FIG. 4 also shows a custom plugin. The custom plugin of FIG. 4 is intended to represent any other plugins not specifically described. In addition, the custom plugin may represent plugins that may support execution of requests by storage device 120 and/or computational device 135 but might not be standardized. For example, a vendor might offer a special function, not offered by other vendors (and possibly not offered in other modules of the vendor), built into a storage device and/or computational device. Or, the storage device/computational device may offer a function not supported by the standard plugin for the module (as may happen if a single plugin is designed to support two or more different types of devices). The custom plugin may provide a mechanism by which these functions may be accessed, and is discussed further with reference to FIG. 7 below.

The presence of custom plugin thus illustrates that the relationship between plugins and modules may be one-to-one, one-to-many, many-to-one, or many-to-many. That is, a single plugin might be associated with one or more different modules, a single module may be associated with multiple plugins, and multiple plugins may each be associated with multiple modules.

As an example, consider a system that includes two NVMe storage devices, one of which offers a special function not generally offered by NVMe storage device, and one computational device implemented as an FPGA. NVMe plugin 150-1 may support services offered by both NVMe storage devices, FPGA plugin 150-2 may support services offered by the FPGA computational device, and a custom plugin may support the special function of the one NVMe storage device. In this example, FPGA plugin 150-2 is associated with one FPGA computational device (a one-to-one relationship), NVMe plugin 150-1 is associated with two NVMe storage devices (a one-to-many relationship), and the one NVMe storage device may also be associated with the custom plugin (a many-to-one relationship) (the latter two relationships combined may also be considered as a many-to-many relationships).

As discussed above, plugins 150-1, 150-2, 150-3, and the custom plugin may receive service request from framework 145 and process them for delivery to the device drivers 130-1, 130-2, 130-3, and the custom driver. Thus, for example, NVMe plugin 150-1 may receive a service request from framework 145 and process the service request for delivery to NVMe driver 130-1. In a similar manner, FPGA plugin 150-2 may receive a service request from framework 145 and process the service request for delivery to FPGA driver 130-2, file system plugin 150-3 may receive a service request from framework 145 and process the service request for delivery to file system driver 130-3, and the custom plugin may receive a service request from framework 145 and process the service request for delivery to the custom driver. Drivers 130-1, 130-2, 130-3, and the custom driver may then deliver the service request to the appropriate modules, be they storage device 120 and/or computational device 135. The specifics of how plugins 150-1, 150-2, 150-3, and the custom plugin perform this processing may depend on the manner in which delivery to storage device 120 and/or computational device 135 may be achieved, and thus may vary from plugin to plugin. For example, NVMe plugin 150-1 may process the service request to produce an NVMe request (such as an NVMe read request or an NVMe write request, among other possibilities), whereas FPGA plugin 150-2 may process the service request to load the data into a memory of computational device 135 and request that a particular service (such as services 335-1 and/or 335-2 of FIGS. 3A-3D) be executed on that data.

In FIG. 4, plugins 150-1, 150-2, 150-3, and the custom plugin are shown as including elements operating in both the user space and the kernel space. In some embodiments of the disclosure, this implementation may be used when the architecture includes a user space and a kernel space. But other architectures may support other implementations. For example, when a Storage Performance Development Kit (SPDK) is used, the device drivers may operate in user space. In such embodiments of the disclosure, there may be no kernel space portion of the plugins 150-1, 150-2, 150-3, or the custom plugin. In other embodiments of the disclosure, CS API library 410 may reside within the kernel space, in which case there may be no user space portion of plugins 150-1, 150-2, 150-3, or the custom plugin. But regardless of the underlying operating system architecture, framework 145 and plugins 150-1, 150-2, 150-3, and the custom plugin, may function similarly from the perspective of application 405 (albeit with potentially different underlying implementations).

One element not touched on above is application adaptor 415. Application adaptor 415 may include a pro-programmed set of API calls that may be used in a particular use case. For example, if computational device 135 implements a particular Structured Query Language (SQL) command, application adaptor 415 may include the particular API calls that load data into a memory of computational device 135 and invoke the SQL command. In this manner, application 405 may use application adaptor 415 to execute such a pre-programmed set of API calls and avoid having to understand how to make the individual API calls. While FIG. 1 shows one application adaptor, embodiments of the disclosure may include any number (zero or more) application adaptors 415. Because application adaptor 415 may issue API calls just like application 405, such API calls may involve service requests that framework 145 may pass to plugins 150-1, 150-2, 150-3, and/or the custom plugin.

Figure 5:
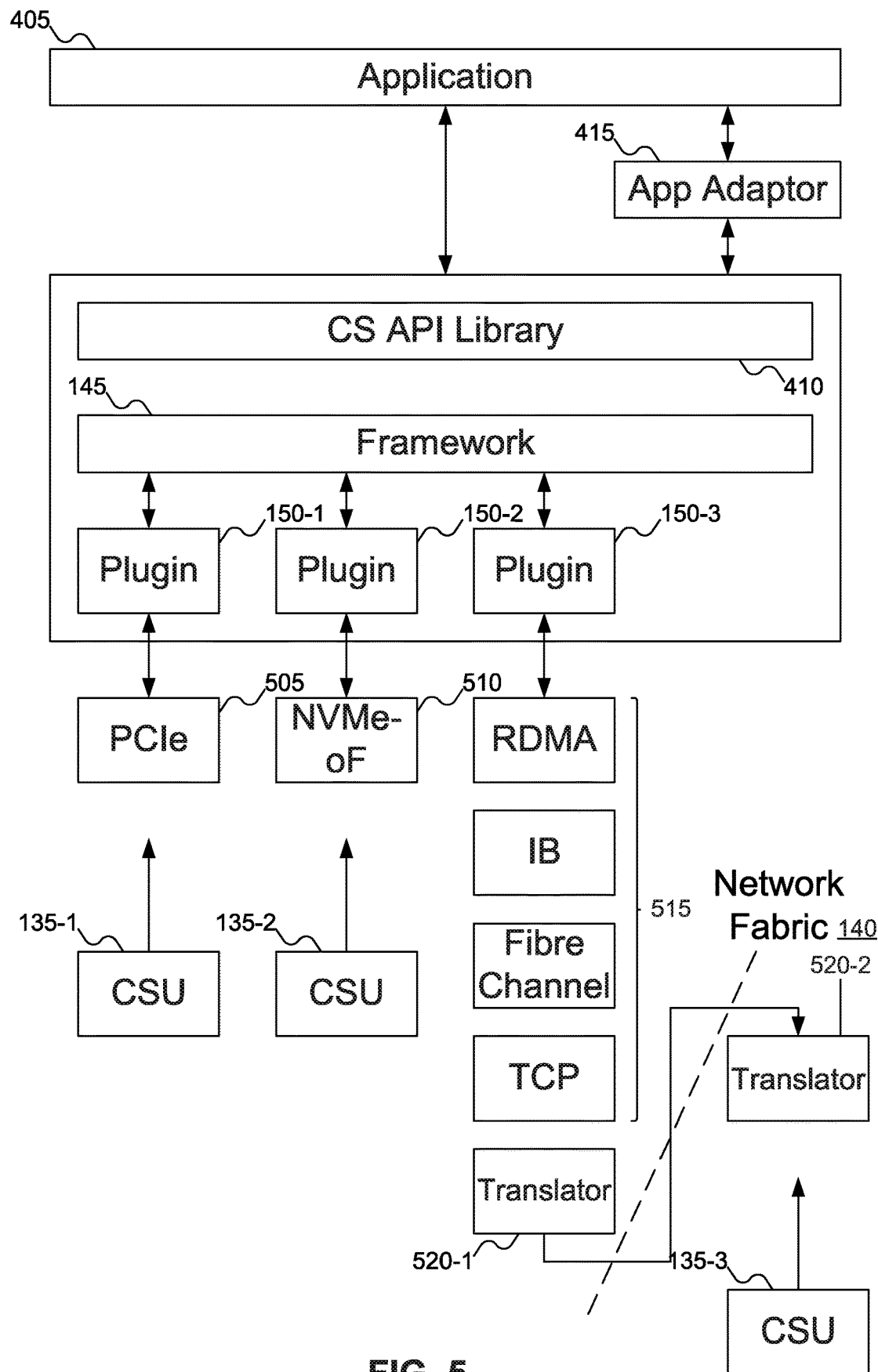
FIG. 5 shows the plugins of FIG. 4 abstracting the transport protocol used for communicating with the computational storage unit of FIG. 1, according to embodiments of the disclosure.

FIG. 5 shows plugins 150 of FIG. 4 abstracting the transport protocol used for communicating with computational device 135 of FIG. 1, according to embodiments of the disclosure. In FIG. 5, application 405, application adaptor 415, CS API library 410, and framework 145 may operate as described with reference to FIG. 4 above.

Plugin 150-1 may represent a plugin that may communicate with local computational device 135-1 that may be accessed, for example, across a PCIe bus in machine 105, using PCIe protocol 505. (While FIG. 5 shows plugin 150-1 communicating with computational device 135-1, embodiments of the disclosure may have plugin 150-1 communicating with storage device 120 of FIG. 1: and reference to a computational device should be understand as also including a storage device.)

Plugin 150-2 may represent a plugin that may communicate with remote computational device 135-2 that may be accessed, for example, across a network using NVMe-oF protocol 510.

Plugin 150-3 may represent a plugin that may communicate with a remote computational device 135-3. But unlike plugins 150-1 and 150-2 that may be communicating using well-defined protocols, plugin 150-3 may establish its own protocol stack. For example, protocol stack 515 includes a Remote Direct Memory Access (RDMA) protocol, which feeds into an InfiniBand (IB) protocol, which feeds into a Fibre Channel (FC) protocol, which feeds into a Transmission Control Protocol (TCP). The information handled by this protocol stack may then feed into translator 520-1, which may handle the actual transmission of the data across fabric 140 to computational device 135-3. Note that remote computational device 135-3 may need its own translator 520-2 to process the information from protocol stack 515.

While FIG. 5 shows remote computational devices 135-2 and/or 135-3 receiving service requests in the "native language" of computational devices 135-2 and/or 135-3, what is not shown in whether the service request is translated into the "native language" of computational devices 135-2 and/or 135-3 before or after transmission across fabric 140 to the remote computational devices. In some embodiments of the disclosure, this processing may be done by the portion of the plugin resident on machine 105 of FIG. 1, with the service request already in the "native language" of the remote computational device (but packaged for transmission across fabric 140). In other embodiments of the disclosure, this processing may be done by the portion of the plugin resident on the remote machine where computational devices 135-2 and/or 135-3 are housed. That is, plugins 150-2 and/or 150-3 may simply package the service request as received from framework 145 for transmission across fabric 140, and after unpackaging the service request by the plugin on the remote machine, the plugin on the remote machine may process the request into the "native language" of remote computational devices 135-2 and/or 135-3.

Figure 6:
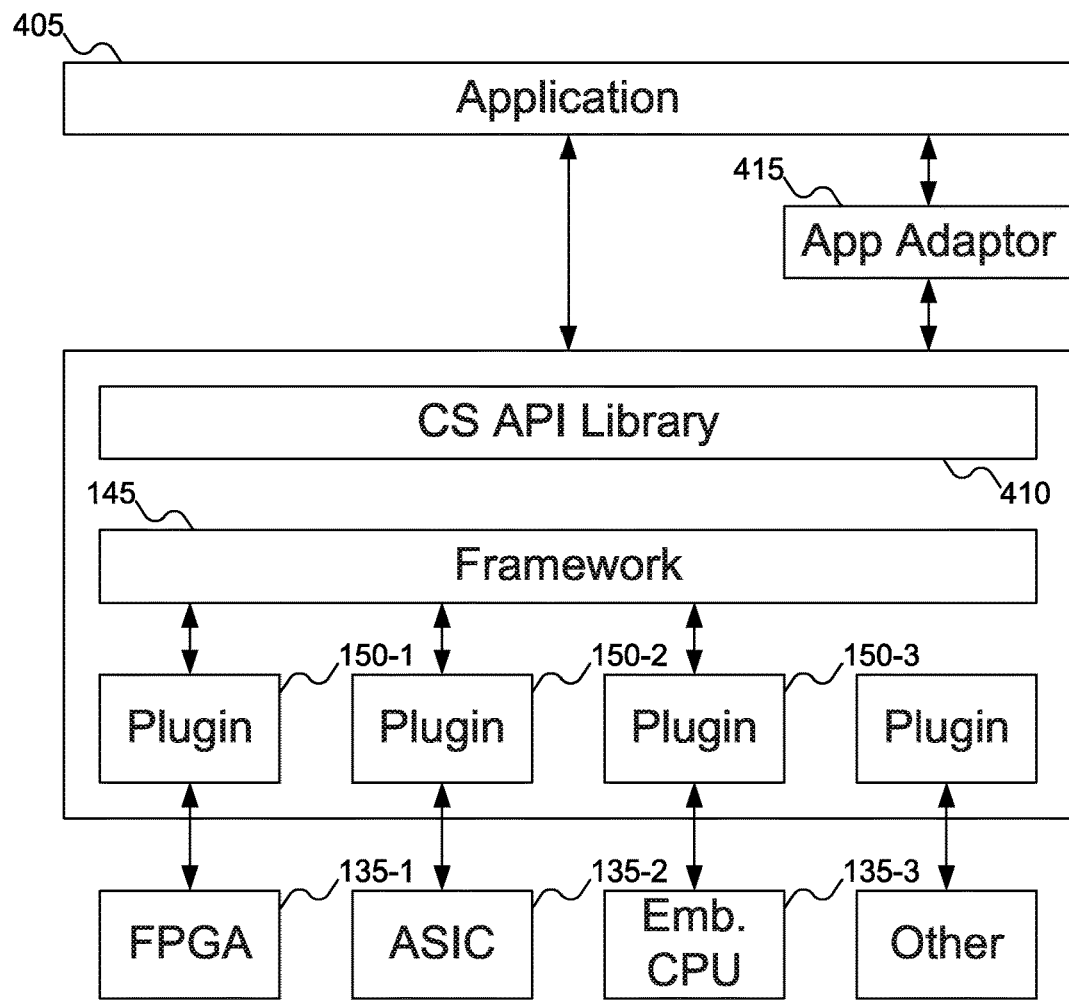
FIG. 6 shows the plugins of FIG. 4 abstracting the type of the computational storage unit of FIG. 1, according to embodiments of the disclosure.

FIG. 6 shows plugins 150 of FIG. 4 abstracting the type of computational device 135 of FIG. 1, according to embodiments of the disclosure. In FIG. 6, application 405, application adaptor 415, CS API library 410, and framework 145 may operate as described with reference to FIG. 4 above.

As far as framework 145 (and application 405 and CS API library 410 as well) is concerned, plugins 150-1, 150-2, and 150-3 are all essentially equivalent. Framework 145 may understand that different plugins may be associated with different storage devices and/or computational devices, but framework 145 may be agnostic regarding what storage devices/computational devices are associated with any particular plugins. Thus, framework 145 may not know that plugin 140-1 is associated with computational device 135-1, which may be an FPGA, that plugin 150-2 is associated with computational device 135-2, which may be an ASIC, or that plugin 150-3 is associated with computational device 135-3, which may be an embedded CPU. In this manner, the particular computational device 135 that handles a request processed by plugins 150 is abstracted away from framework 145 (and from all elements "before" framework 145 in the hierarchy).

Figure 7:
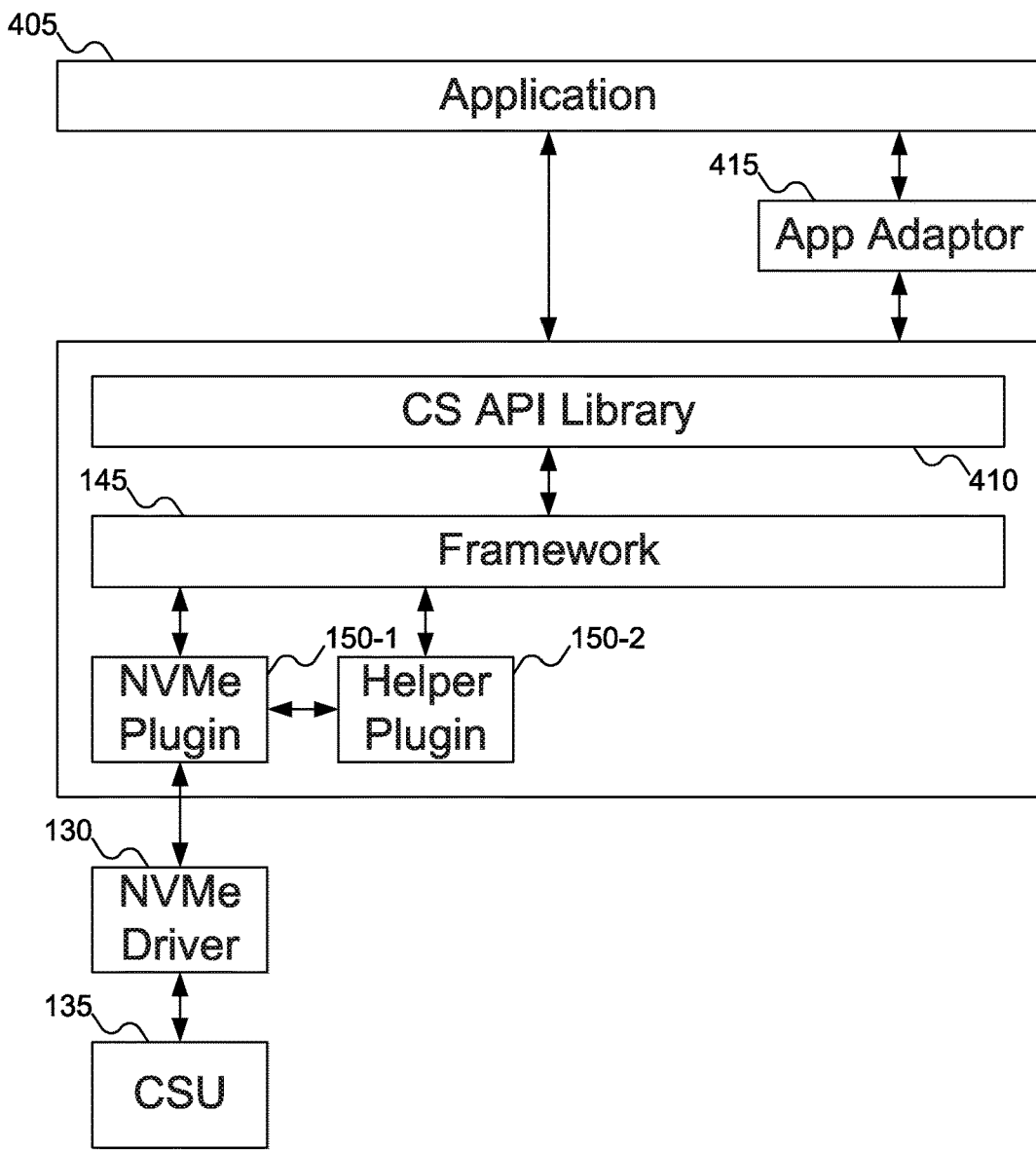
FIG. 7 shows the plugins of FIG. 4 abstracting a feature of the computational storage unit of FIG. 1, according to embodiments of the disclosure.

FIG. 7 shows plugins 150 of FIG. 4 abstracting a feature of computational device 135 of FIG. 1, according to embodiments of the disclosure. As discussed above with reference to FIG. 4, sometimes a plugin, such as plugin 150-1, may not be able to completely process a request to be executed by the associated device. While FIG. 7 shows plugin 150-1 as NVMe plugin 150-1, embodiments of the disclosure may include any plugin that may use a helper plugin.

This situation may occur, for example, if application 405 issues a file system request, but the device in question (such as computational device 135) may expect a request to use a different storage model (for example, a block-based request, a key-value (KV) request, or (more generally) an object request). Future storage devices also may not expose the device or its internal memory to application 405, in which case computational device 135 may not support file system calls, and a helper plugin may be needed.

This situation may also occur if the associated device offers a feature not supported by the primary plugin associated with the device. For example, computational device 135 may support the use of containers or offer an extended Berkeley Packet Filter (eBPF) feature. eBPF (or, more generally, BPF) is a feature that permits source code to be validated and compiled into a portable byte code using the eBPF instruction set. This portable byte code may then be compiled or interpreted to execute on the target hardware. There are limits to what may be executed using the BPF feature: for example, the source code might not be permitted to include unbounded loops, jumps, or execution of code outside the portable byte code (such as a remote procedure call). eBPF features may be added to future or even existing computational devices, since they may execute somewhat general code using appropriate computational device hardware. But if the plugin that normally communicates with the device driver does not know how to process eBPF code, a helper plugin may be needed.

Another example of a situation where this may occur is, for example, in the use of a portable byte code to be executed by computational storage unit 135.

In such situations, NVMe plugin 150-1 may use helper plugin 150-2 to process the portion of the service request that NVMe plugin 150-1 does not know how to process. For example, NVMe plugin 150-1 may call helper plugin 150-2 to convert a file system call into a block-based request (or a KV request, or an object request, or any other type of request, depending on the requests accepted by the associated module). Or, NVMe plugin 150-1 may call helper plugin 150-2 to handle the part of the request related to the feature that is not processed by NVMe plugin 150-1. Once helper module 150-2 has completed its processing, NVMe plugin 150-1 may complete the processing of the service request and may deliver the request to NVMe driver 130 for ultimate delivery to the module.

Framework 145 may support a call that enables NVMe plugin 150-1 to query for available helper plugins 150-2. Using such calls, NVMe plugin 150-1 may be able to identify what plugins are registered with framework 145 and may be able to act as helper plugin 150-2.

While the above discussion suggests that NVMe plugin 150-1 is called first, and may then call helper plugin 150-2, embodiments of the disclosure may operate in other sequences as well. For example, helper plugin 150-2 may initially receive the service request, handle the portion of the service request that is unfamiliar to NVMe plugin 150-1, and then transfer the (partially processed) service request to NVMe plugin 150-1. Or, helper plugin 150-2 may initially receive the request, handle its portion of the service request, then return the (partially processed) service request back to framework 145 so that framework 145 may identify NVMe plugin 150-1 to continue processing the service request.

Because converting a file system call into a request that is appropriate for the device may be done on the host system (before NVMe plugin 150-1 may process the service request and deliver the service request to NVMe driver 130), a file system plugin may be an example of a host level abstraction (where the processing is performed by the host rather than requesting a particular feature of storage device 120 of FIG. 1 or computational device 135 be used).

While the above discussion focuses on NVMe plugin 150-1 using a file system plugin as helper plugin 150-1, embodiments of the disclosure may include any plugin that may use helper plugin 150-2. Further, embodiments of the disclosure may include any plugin, and not just a file system plugin, operating as helper plugin 150-2.

Because one plugin may call another plugin, plugins 150-1 and/or 150-2 may expose methods to enable such inter-plugin calls.

Figure 8:
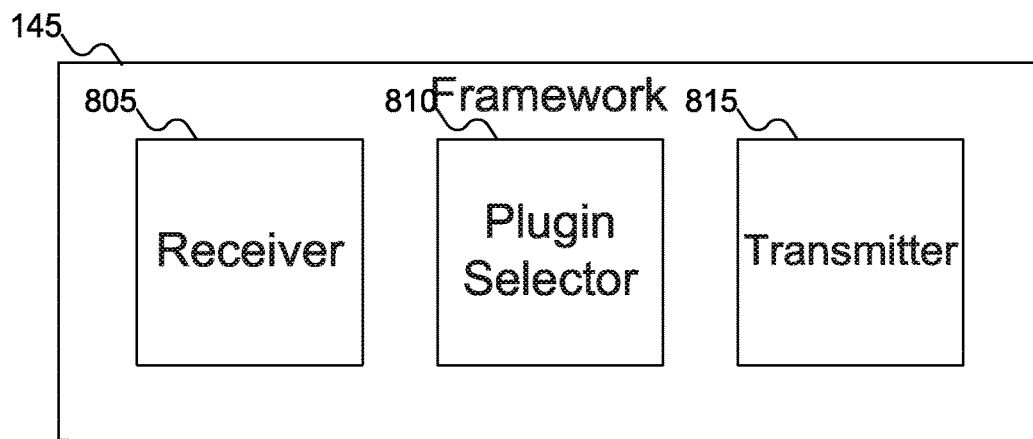
FIG. 8 shows details of the framework of FIG. 1, according to embodiments of the disclosure.

FIG. 8 shows details of framework 145 of FIG. 1, according to embodiments of the disclosure. In FIG. 8, framework 145 is shown as including receiver 805, plugin selector 810, and transmitter 815. Receiver 805 may receive a request from machine 105, which may be a service request from application 405 of FIG. 4, or a request to register or deregister plugin 150 of FIG. 1 with framework 145. Receiver 805 may also receive a service response from plugin 150 after plugin 150 and its associated module has completed processing of the service request from application 405 of FIG. 4. Plugin selector 810 may select plugin 150 to process a service request from application 150. Plugin selector 810 is discussed further with reference to FIGS. 10-11 below. Finally, transmitter 815 may transmit a service request received from application 405 of FIG. 4 to plugin 150 of FIG. 1, and may transmit a service response received from plugin 150 of FIG. 1 to application 405 of FIG. 4.

Figure 9:
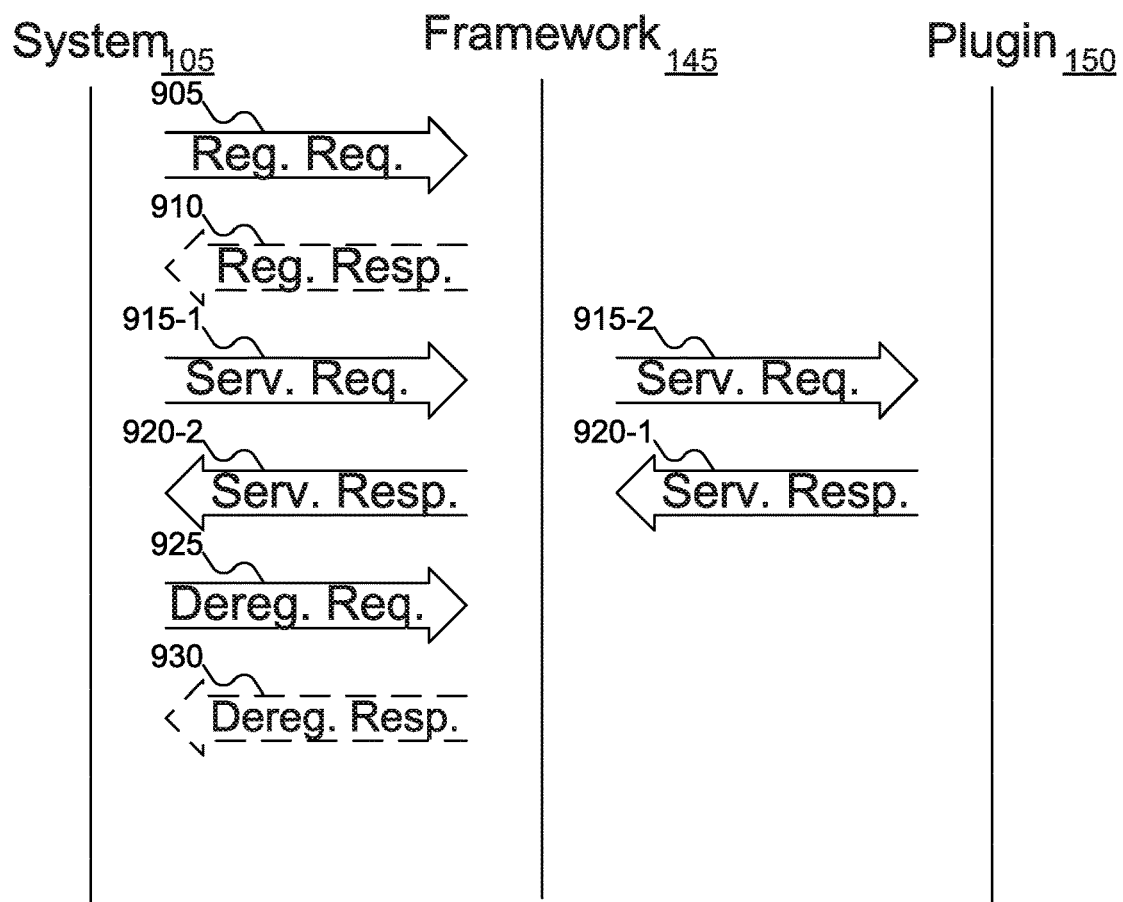
FIG. 9 shows an exchange of messages among the machine of FIG. 1, the framework of FIG. 1, and the plugin of FIG. 1, according to embodiments of the disclosure.

FIG. 9 shows an exchange of messages among machine 105 of FIG. 1, framework 145 of FIG. 1, and plugin 150 of FIG. 1, according to embodiments of the disclosure. In FIG. 9, system 105 may transmit registration request 905 to framework 145, which framework 145 may receive using receiver 805 of FIG. 8. Registration request 905 may be used to register a new plugin 150 with framework 145. Registration request may be sent by a system administrator, or may be sent automatically when new hardware is added or a new hardware feature becomes available. A new plugin may be registered when a new module is added that may require a new plugin, or when a new plugin is to be added to support a new feature offered by an existing module. At block 910, after framework 145 has completed the registration of the new plugin 150, framework 145 may transmit registration response 910 to system 105 using transmitter 815 of FIG. 8. Registration response 910 may be omitted, as shown by the dashed lines for registration response 910.

Note that while registration request 905 may be sent every time a new module is added to system 105, this fact does not mean that a new plugin 150 is registered every time registration request 905 is sent. As discussed above, a single plugin may be associated with multiple different modules. Thus, if the plugin being registered using registration request 905 is already registered with framework 145, then registration response 910 may indicate that registration was not performed because plugin 150 was already registered. In this manner, the system administrator does not need to track which plugins are registered with framework 145: framework 145 may decide whether or not to register any particular plugin by comparing the plugin being registered with the previously registered plugins. Of course, if the system administrator knows that plugin 150 is already registered, then the system administrator may skip sending registration request 905 in the first place, even if a new module is added.

Once plugin 150 is registered with framework 145, application 405 of FIG. 4 may send service request 915-1, which framework 145 may receive using receiver 805 of FIG. 8. Framework 145 may use plugin selector 810 of FIG. 8 to select plugin 150 to process service request 915-1, and may forward service request 915-2 to plugin 150 using transmitter 145. Plugin 150 may then process service request 915-2.

Once plugin 150 has completed processing service request 915-2, plugin 150 may send service response 920-1 to framework 145, which framework 145 may receive using receiver 805 of FIG. 8. Framework 145 may then transmit service response 920-2 to application 405 of FIG. 4 using transmitter 815.

Note that plugin 150 may process any number of service requests from application 405 (or other applications on system 105): there is no requirement that the exchange of messages among system 105, framework 145, and plugin 150 include exactly one service request.

Eventually, the system administrator may decide plugin 150 is not needed anymore. The system administrator may then send deregistration request 925 to framework 145, which framework 145 may receive using receiver 805 of FIG. 8. Framework 145 may then deregister plugin 150, and may send deregistration response 930 back to the system administrator using transmitter 815 of FIG. 8. Deregistration response 930 may be omitted, as shown by the dashed lines for deregistration response 930.

Note that while framework 145 may check for plugin duplication upon registration, framework 145 may not have any way to check whether deregistration of a plugin is appropriate. For example, it might be that there is still a module in system 105 that might depend on plugin 150: if plugin 150 is deregistered, that module might not be accessible for service request 915-1 from application 405 of FIG. 4. But framework 145 may not be able to determine this fact, and may therefore deregister plugin 150 even when plugin 150 might still be useful: framework 145 may rely on the system administrator being correct in deregistering plugin 150.

Figures 10, 11:
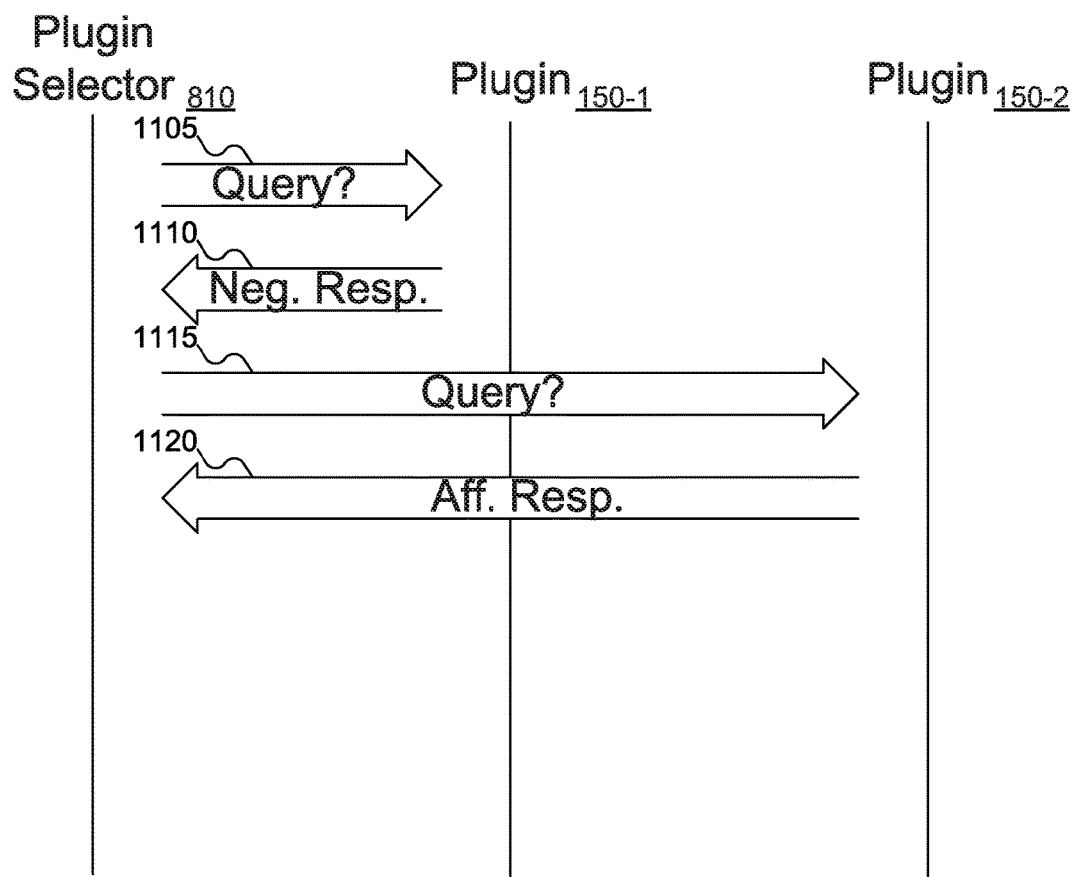
FIG. 10 shows details of a mapping between services and the plugin of FIG. 1, as may be used by the framework of FIG. 1, according to embodiments of the disclosure.
FIG. 11 shows an exchange of messages between the framework of FIG. 1 and the plugin of FIG. 1, according to embodiments of the disclosure.

FIG. 10 shows details of a mapping between services and plugin 150 of FIG. 1, as may be used by framework 145 of FIG. 1, according to embodiments of the disclosure. In FIG. 10, table 1005 is shown. Table 1005 is one example representation of how to map services to plugins; other mappings may also be used without limitation. Table 1005 shows three services, which map to various plugins. For example, service 1010 is shown as mapping to plugin 1, plugin 2, and plugin 3. Table 1005 may include any number (zero or more) of mappings between services and plugins, and each service may map to any number (zero or more) plugins. Further, while table 1005 shows each plugin being mapped to by a single service, embodiments of the disclosure may include multiple services mapping to a single plugin. For example, computational devices 310-1 through 310-4 of FIGS. 3A-3D are shown as offering services 335-1 and 335-2 of FIGS. 3A-3D. If a single plugin is capable of processing both of these service requests, then a two or more services in table 110 may map to a single plugin.

Framework 145 of FIG. 1 may learn which services may be processed by a single plugin when the system administrator registers the plugin. That is, the plugin itself, as part of the registration process, may identify which services it can process. Framework 145 of FIG. 1 may use this information to build table 1005.

In a similar manner, when application 405 of FIG. 4 issues service request 915-1 of FIG. 9, service request 915-1 of FIG. 9 may identify the particular service being requested. Framework 145 (more particularly, plugin selector 810 of FIG. 8) may use this information with table 1005 to identify which plugins to query to process service request 915-1 of FIG. 9.

Note that "service" in the context of table 1005 may mean a general type of service, rather than a particular function. For example, service request 915-1 of FIG. 9 may request a function that may require an embedded CPU, or may request a function that would be implemented using an FPGA or an ASIC. In accessing table 1005 to select a plugin to execute service request 915-1 of FIG. 9, framework 145 of FIG. 4 may simply use the generic type of service being sought, rather than the particular function to be executed. But in other embodiments of the disclosure the "service" identified in table 1005 may have a more fine-grained definition, perhaps all the way down to the individual function to be executed.

Note that for most services in table 1005, there may be at least one plugin to which the service maps. This plugin would be the host level abstraction, discussed with reference to FIG. 1. Since the host level abstraction should be available to execute services for application 405 of FIG. 4 if the expected hardware is not available, the host level abstraction may be associated with most services. (One exception may be for services that involve reading data from or writing data to storage device 120 of FIG. 1, as it may not be possible to emulate with processor 110 of FIG. 1 the reading of data from or the writing of data to a particular storage device.) In some embodiments of the disclosure, if there a plugin associated with a module that may execute a service request, using such a plugin instead of a host level abstraction plugin would be desirable, as such operation would reduce the load on processor 110. In other embodiments of the disclosure, the host level abstraction plugin may be selected by plugin selector 810, even if other plugins may be capable of carrying out the service request.

Note that FIG. 10 does not show a relationship between plugins and associated devices. This is because it is up to the individual plugins to track which associated devices they support. All that matters to framework 145 of FIG. 1 is that plugin 150 of FIG. 1 provides correct information about what services it supports and that plugin 150 of FIG. 1 conforms to the interface with framework 145 of FIG. 1. As far as framework 145 of FIG. 1 is concerned, once service request 915-1 of FIG. 1 is delivered to plugin 150 of FIG. 1, it is up to plugin 150 of FIG. 1 to complete the execution of service request 915-2 of FIG. 9. How plugin 150 of FIG. 1 completes service request 915-2 of FIG. 9—what plugin 150 of FIG. 1 does once it has received service request 915-2 of FIG. 9—is not relevant to framework 145 of FIG. 1.

In general, plugin 150 of FIG. 1, once it has received service request 915-2 of FIG. 9, may identify the appropriate module to carry out service request 915-2 of FIG. 9. Plugin 150 of FIG. 1 may include its own table, similar to table 1005, identifying which services may be performed by which modules. For example, plugin 150 may include a range of addresses (which may be logical addresses used by application 405 of FIG. 1) that may be mapped to particular storage devices 120 of FIG. 1, and may include its own list of services offered by the various associated modules. In this manner, plugin 150 of FIG. 1 may process service request 915-2 of FIG. 9 into a form expected by the device driver and may send the request to the appropriate device driver 130 (and ultimately to the appropriate module).

As may be seen in in table 1005, there may be more than one plugin that may be associated with a particular service. But this fact does not automatically mean that any plugin associated with a particular service may execute a particular service request. For example, just because service request 915-1 of FIG. 9 from application 405 of FIG. 4 includes a request for service 1010, it does not automatically follow that any of plugin 1, plugin 2, or plugin 3 may be asked to perform the service. For example, consider the situation where application 405 of FIG. 4 requests that data be read from storage device 120 of FIG. 1: it may be that only the plugin associated with storage device 120 of FIG. 1 may be able to execute this service request (plugins associated with other storage devices may not be able to access storage device 120 of FIG. 1, and therefore may not be able to read the requested data). Or, consider the situation where there are two computational devices 135 of FIG. 1, each including ASIC, each ASIC implementing a different function: only the computational device 135 of FIG. 1 that includes the ASIC that actually implements the requested function may be able to service the request. The question then becomes how does framework 145 of FIG. 1 (more particularly, plugin selector 810 of FIG. 8) select the appropriate plugin to execute the request.

The answer is that plugin selector 810 of FIG. 8 may query individual plugins associated with the service to find one that will accept service request 915-1 of FIG. 9. That is, plugin selector 810 of FIG. 8 may ask each plugin associated with the service in table 1005 if it will accept a particular service request: the plugin that accepts the service request may then process the service request.

One way for plugin selector 810 of FIG. 8 to operate is to send a multicast message to all plugins associated with the request service: the plugin that sends back the first affirmative response (meaning that the plugin may process the service request) may be asked to process the service request. But this approach may involve a large number of messages travelling between framework 145 of FIG. 1 and plugins 150 of FIG. 1.

Another approach is shown in FIG. 11, involving an exchange of messages between framework 145 of FIG. 1 and plugins 150-1 and 150-2 of FIG. 4, according to embodiments of the disclosure. Plugin selector 810 (as part of framework 145 of FIG. 1) may send query 1105 to plugin 150-1, asking if plugin 150-1 may carry out service request 915-1 of FIG. 9. In the example shown in FIG. 11, plugin 150-1 is shown sending negative response 1110, meaning that plugin 150-1 may not carry out service request 915-1 of FIG. 9. Plugin selector 810 may then send query 1115 to plugin 150-2, asking if plugin 150-2 may carry out service request 915-1 of FIG. 9. In the example shown in FIG. 11, plugin 150-2 is shown sending affirmative response 1120, meaning that plugin 150-1 may carry out service request 915-1 of FIG. 9. Upon receiving affirmative response 1120, plugin selector 810 may select plugin 150-2 to execute service request 915-1 of FIG. 9. The approach shown in FIG. 11 may avoid sending a large number of queries to plugins at the same time (potentially saturating bandwidth); but by querying plugins 150 individually, it may take a little longer to find plugin 150-2 to process service request 915-1 of FIG. 9.

While FIG. 11 shows only one plugin 150-1 sending negative response 1110 to plugin selector 810, embodiments of the disclosure may include any number of negative responses 1110 from any number of plugins 150. That is, plugin selector 810 may find a plugin that accepts service request 915-1 of FIG. 1 after querying only one plugin, or plugin selector 810 may receive negative responses 1110 from any number (zero or more) plugins 150 before receiving affirmative response 1120 from plugin 150-2. In addition, plugin selector 810 might not receive affirmative response 1120 from any plugin 150, in which case the host level abstraction plugin might be used to execute service request 915-1 of FIG. 9.

There are various reasons why plugin 150-1 might send negative response 1110. One reason might be because the device associated with plugin 150-1 may lack the necessary hardware to carry out service request 915-1 of FIG. 1. Another reason might be because the device associated with plugin 150-1 might not have access to the data to be processed. But plugin 150-1 might also send negative response 1110 because plugin 150-1 (or its associated device) has a backlog of requests to process, and another plugin 150 might be able to process service request 915-1 of FIG. 9 faster. Another reason why plugin 150 might send negative response 1110 is because plugin 150-1 does not know how to handle the request, but may be able to process the request after a helper plugin (such as helper plugin 150-2 of FIG. 7) processes the request.

There is one risk associated with plugin 150-1 sending negative response 1110 even though plugin 150-1 is capable of processing service request 915-1 of FIG. 9: what if plugin 150-1 is the only plugin capable of processing service request 915-1 of FIG. 9? There are at least two ways to reduce this risk. One approach may involve recalling that the host level abstraction plugin should be available in most cases to process service request 915-1 of FIG. 9, which means that if plugin 150-1 refuses to process service request 915-1 of FIG. 9, there is still at least one plugin that may process service request 915-1 of FIG. 9. (If service request 915-1 of FIG. 9 involves reading data from or writing data to storage device 120 of FIG. 1 or some other request that requires the device associated with plugin 150-1, then plugin 150-1 should not refuse service request 915-1 of FIG. 9 even if the associated device has a large number of requests pending). Another approach may involve plugin 150-1 not refusing service request 915-1 of FIG. 9 outright, but instead returning a representation of the interest in plugin 150-1 to process service request 915-1 of FIG. 9. For example, a value of 0 could mean that plugin 150-1 outright refuses to process service request 915-1 of FIG. 9 (which would mean that the module associated with plugin 150-1 lacks the appropriate hardware to execute service request 915-1 of FIG. 9); any other number may indicate the number of requests already pending with plugin 150-1 (and therefore roughly indicating how long it may take plugin 150-1 to process service request 915-1 of FIG. 9). Plugin selector 810 may then select the plugin with the lowest non-zero response to process service request 915-1 of FIG. 9. (Of course, framework 145 of FIG. 1 may track how many service requests 915-2 of FIG. 9 have been sent to plugin 150-1 for which service responses 920-1 of FIG. 9 have not yet been received, in which case plugin 150-1 may simply indicate that it is capable of processing service request 915-1 of FIG. 1 and leave it to plugin selector 810 to decide which plugin 150 of FIG. 1 may process service request 915-1 of FIG. 1.)

Another possibility would be for plugin 150-1 to use values between 0 and 10 to indicate interest in processing service request 915-1 of FIG. 1, with 0 indicating no interest and 10 indicating complete interest: plugin selector 810 may then select plugin 150 of FIG. 1 that returns the highest level of interest in processing service request 915-1 of FIG. 9.

The values and ranges used above are merely examples. Embodiments of the disclosure may use any values and/or ranges (including non-numeric values and/or ranges).

Figure 12A:
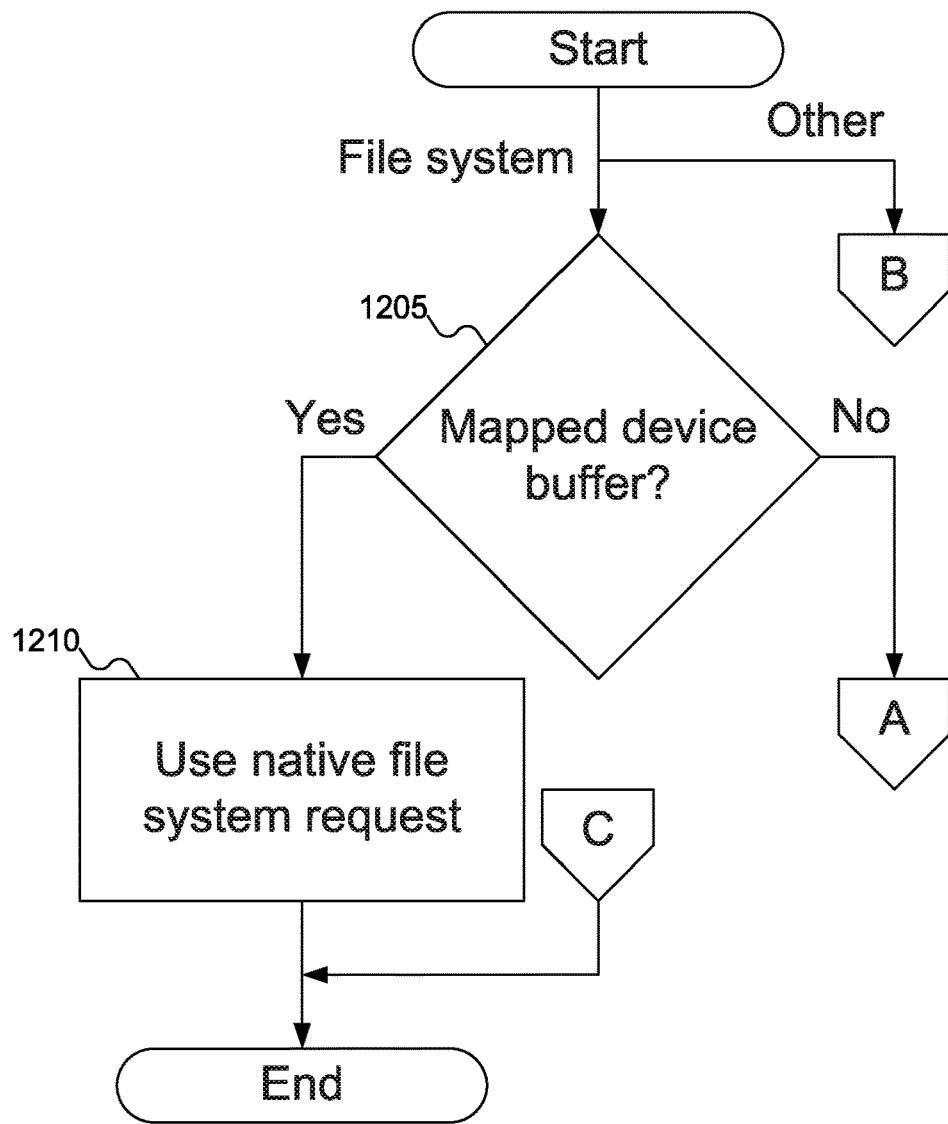
FIG. 12A shows a flowchart of an example procedure for the plugins of FIG. 4 to process a request to access data on the storage device of FIG. 1, according to embodiments of the disclosure.
Figure 12B:
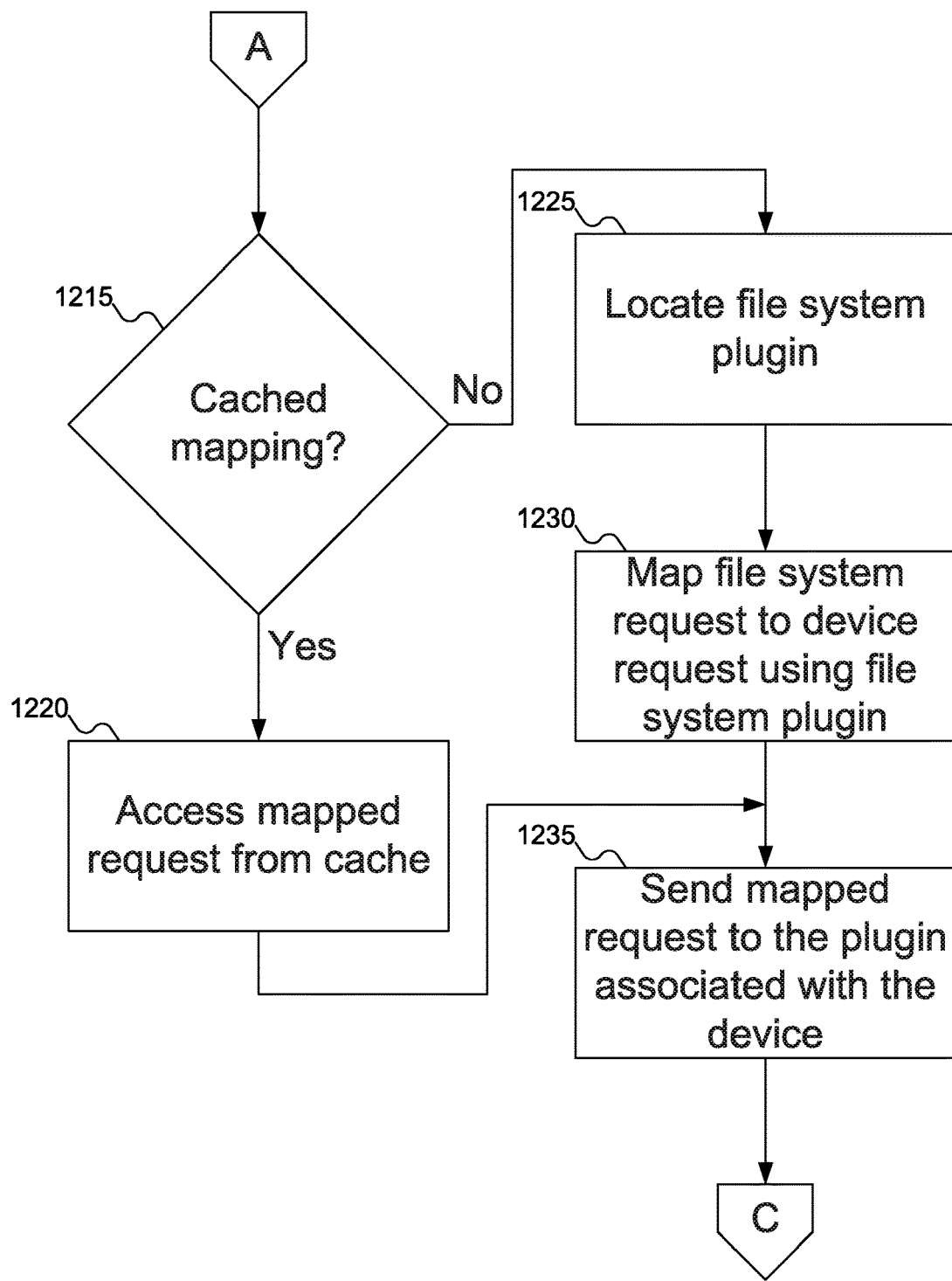
FIG. 12B continues the flowchart of the example procedure for the plugins of FIG. 4 to process a request to access data on the storage device of FIG. 1, according to embodiments of the disclosure.
Figure 12C:
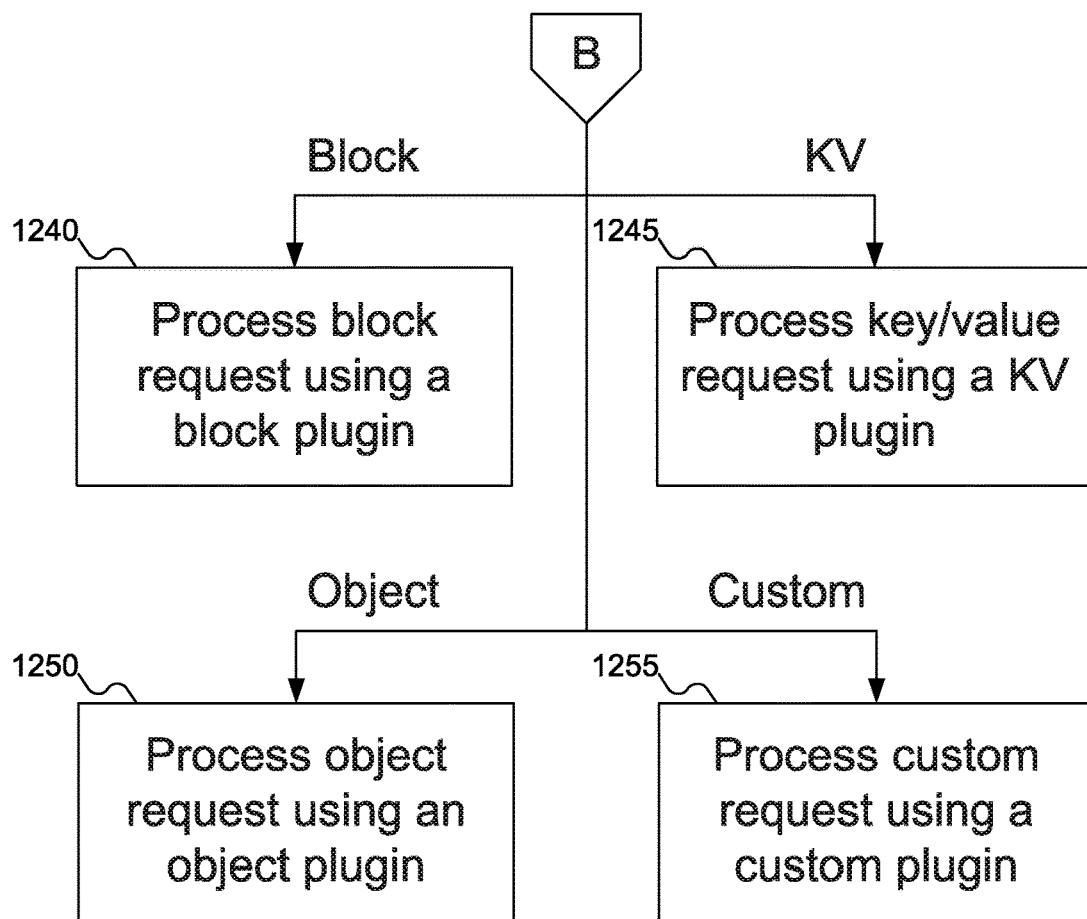
FIG. 12C continues the flowchart of the example procedure for the plugins of FIG. 4 to process a request to access data on the storage device of FIG. 1, according to embodiments of the disclosure.

FIGS. 12A-12C show a flowchart of an example procedure for plugins 150 of FIG. 4 to process a request to access data on storage device 120 of FIG. 1, according to embodiments of the disclosure. In FIG. 12A, a request to access data may be received. Framework 145 of FIG. 1 may determine the type of the access request: the access request may include a file system request, a block-based request, a KV request, an object request, or a custom request.

If the request is a file system request, then at block 1205 framework 145 of FIG. 1 may determine if the device buffer if mapped. If the device buffer is mapped, then the device may support native file system requests, and at block 1210 the native file system request may be used to access the device.

If the device buffer is not mapped, then the device may not support native file system requests and may need an interpreter to map the filesystem request into a low level block request by mapping the file's offset/length co-ordinates to logical block addresses (LBAs): a service that file system plugin 150-3 of FIG. 3 may be able to provide. In that case, file system plugin 150-3 of FIG. 4 may be used to convert the file system request into a form appropriate for the device. At block 1215 (FIG. 12B), framework 145 of FIG. 1 may check to see if the file system request has been mapped previously and is currently cached in a cache. If the mapping is already cached, then at block 1220 framework 145 of FIG. 1 may skip invoking file system plugin 150-3 of FIG. 4 and just access the native request (which may also be called the mapped request) for the device from the cache. Otherwise, at block 1225, framework 145 of FIG. 1 may locate file system plugin 150-3 of FIG. 4, and at block 1230 file system plugin 150-3 of FIG. 4 may map the file system request into the native request for the device. Either way, at block 1235, the native request may be sent to the plugin associated with the device. As discussed above with reference to FIG. 7, this transmission of the native request to the plugin associated with the device may be accomplished by file system plugin 150-3 of FIG. 4 calling the plugin associated with the device, by file system plugin 150-3 of FIG. 4 returning the native request to the plugin associated with the device in response to a call from that plugin, or by file system plugin 150-3 returning the native request to framework 145 of FIG. 1 and asking framework 145 of FIG. 1 to forward the native request to the plugin associated with the device. Note that regardless of the manner in which the native request is passed to the plugin associated with the device, the result is as though the example flowchart of FIGS. 12A-12C was restarted but now using the native request rather than the file system request.

If the request received by framework 145 of FIG. 1 was not a file system request, then the request was already in a native format for the device. In that case, the native request may be delivered to the plugin associated with the device. As shown in FIG. 12C, block requests may be processed in block 1240, KV requests may be processed in block 1245, object requests (which may be generalized versions of KV requests) may be processed in block 1250, and custom requests may be processed in block 1255. Regardless of the form actually taken by the native request, the appropriate plugin that may execute the native request may be identified by plugin selector 810, and the request may be delivered to the appropriate module using that identified plugin.

Figure 13:
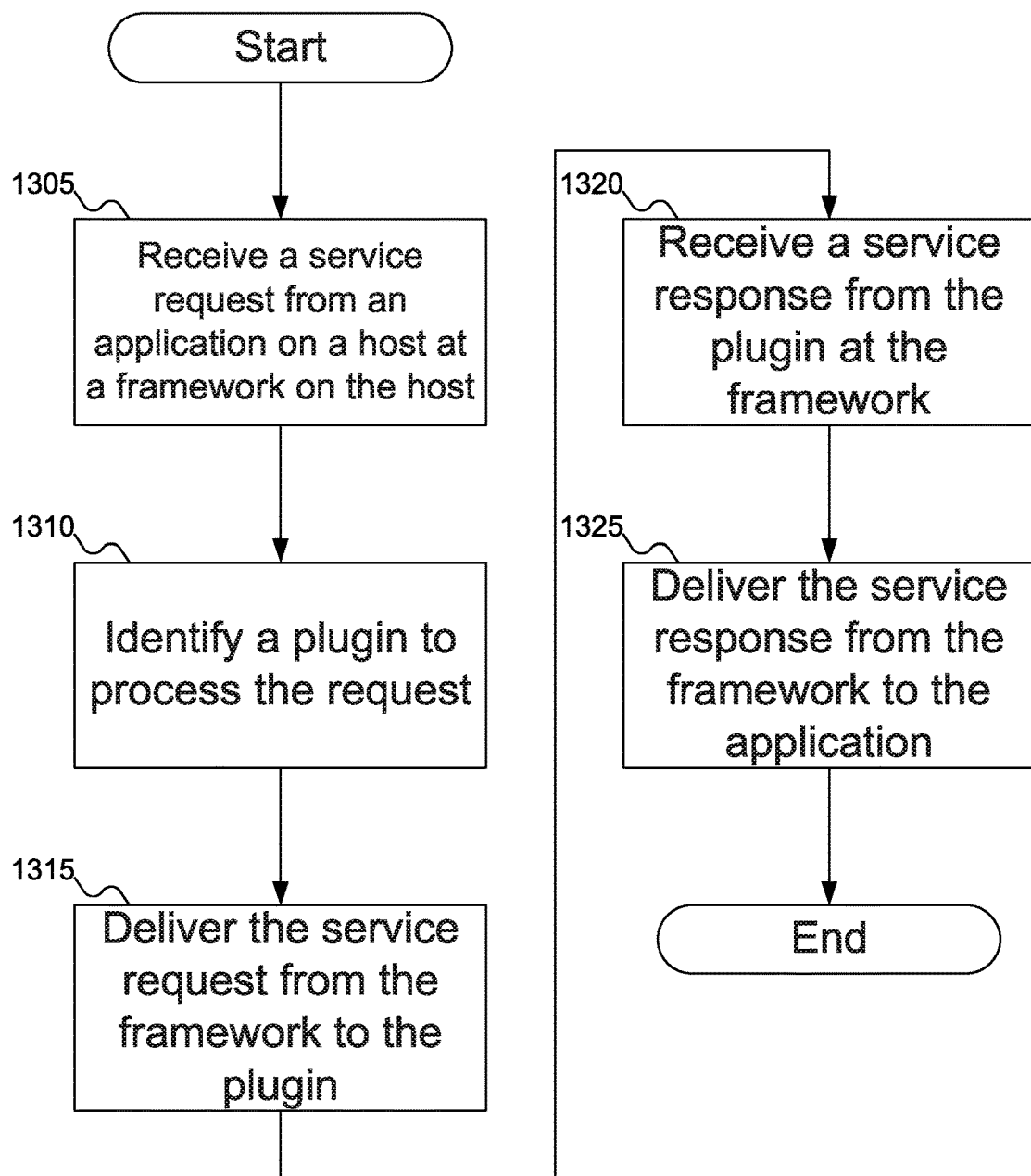
FIG. 13 shows a flowchart of an example procedure for the framework of FIG. 1 to process the service request of FIG. 9 from the application of FIG. 1 using the plugins of FIG. 4, according to embodiments of the disclosure.

FIG. 13 shows a flowchart of an example procedure for framework 145 of FIG. 1 to process service request 915-1 of FIG. 9 from the application of FIG. 1 using plugins 150 of FIG. 4, according to embodiments of the disclosure. In FIG. 13, at block 1305, receiver 805 of FIG. 8 may receive service request 915-1 of FIG. 9 from application 405 of FIG. 4. At block 1310, plugin selector 810 of FIG. 8 may select plugin 150 of FIG. 1 to process service request 915-1 of FIG. 9. At block 1315, transmitter 815 of FIG. 8 may deliver service request 915-2 of FIG. 9 to plugin 150 of FIG. 1. At block 1320, receiver 805 of FIG. 8 may receive service response 920-1 of FIG. 9 from plugin 150 of FIG. 1. Finally, at block 1325, transmitter 815 of FIG. 8 may transmit service response 920-2 of FIG. 9 to application 405 of FIG. 4.

Figure 14A:
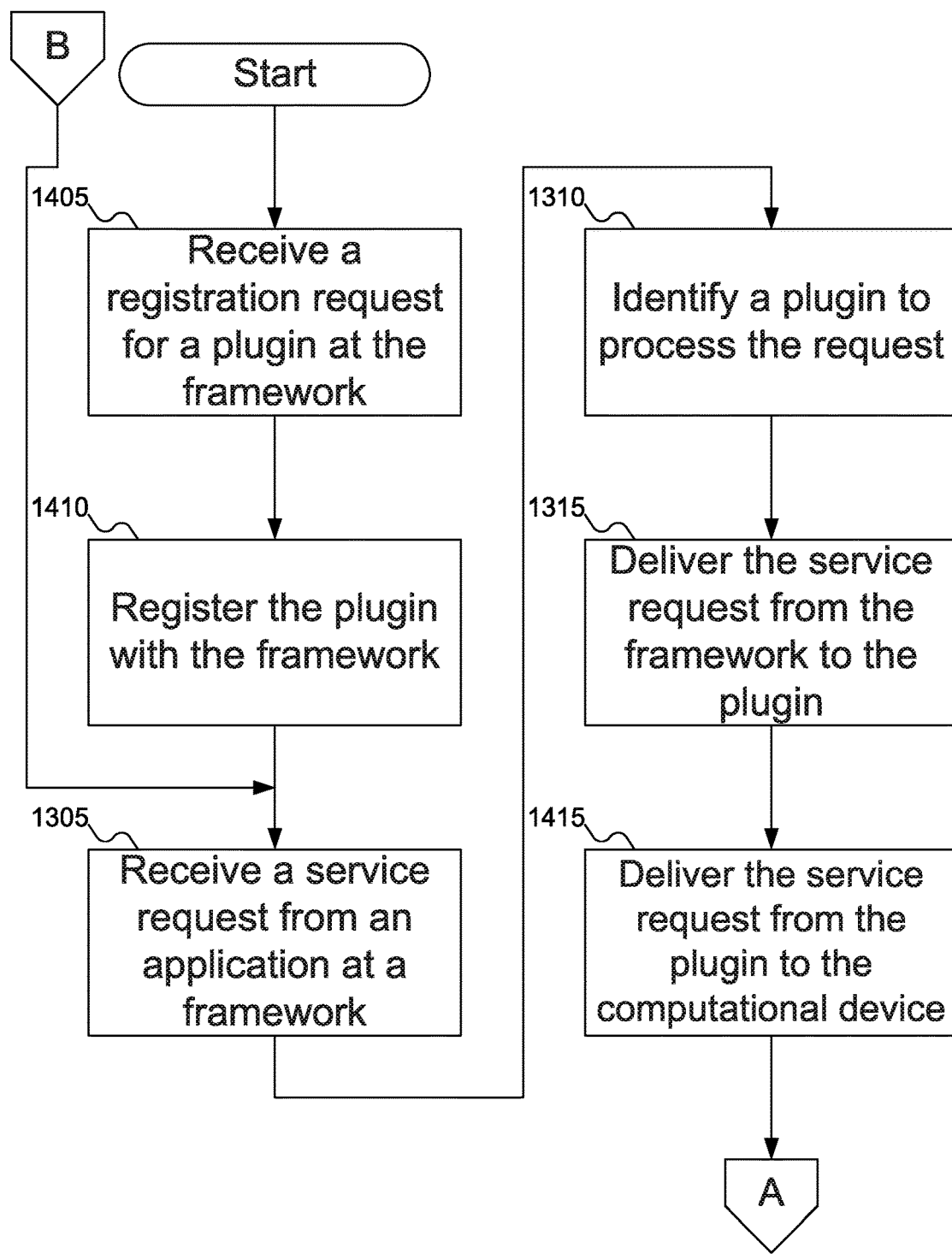
FIG. 14A shows a flowchart of another example procedure for the framework of FIG. 1 to process the service request of FIG. 9 from the application of FIG. 1 using the plugins of FIG. 4, according to embodiments of the disclosure.
Figure 14B:
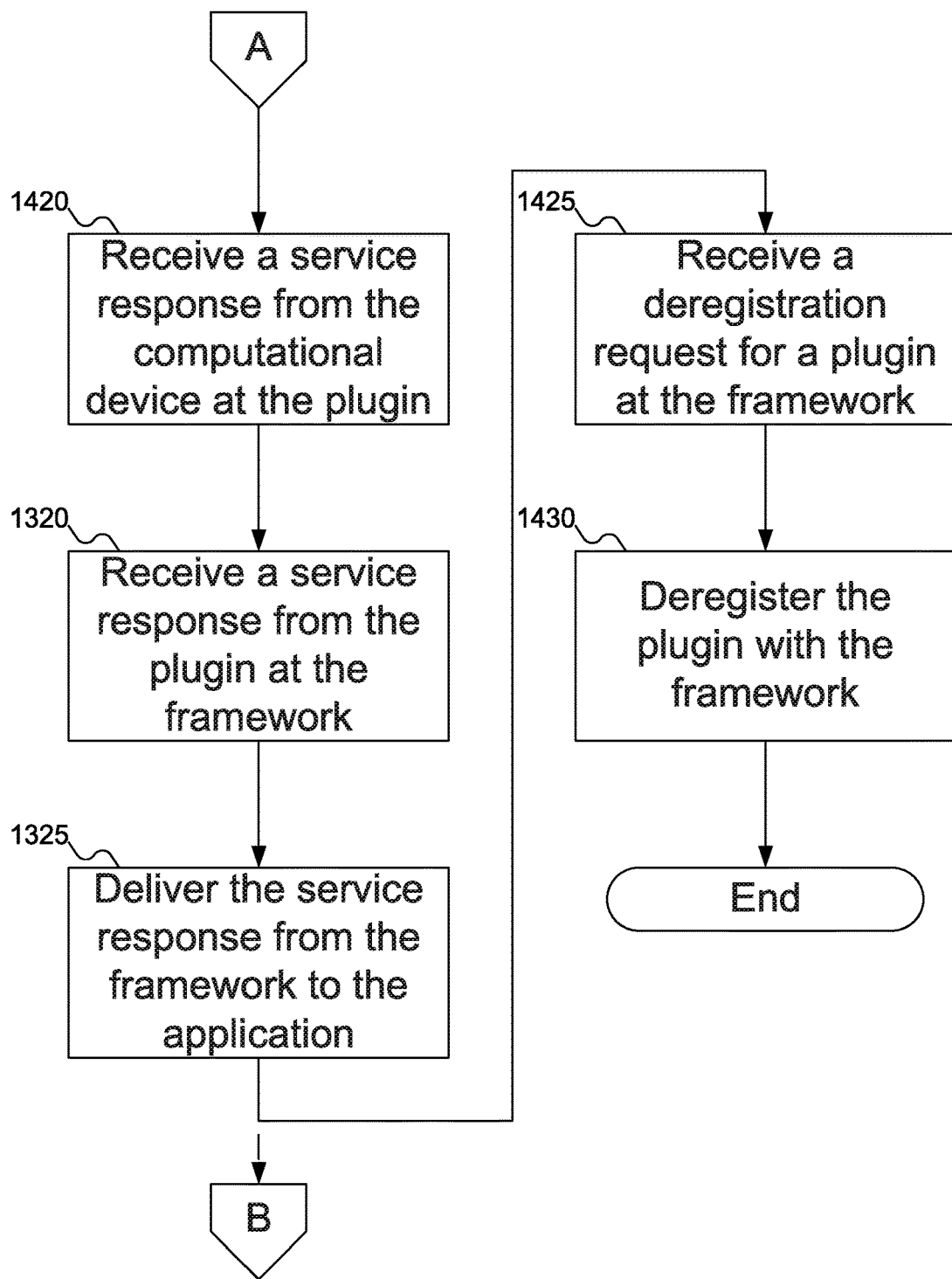
FIG. 14B continues the flowchart of the other example procedure for the framework of FIG. 1 to process the service request of FIG. 9 from the application of FIG. 1 using the plugins of FIG. 4, according to embodiments of the disclosure.

FIGS. 14A-14B show a flowchart of another example procedure for framework 145 of FIG. 1 to process service request 915-1 of FIG. 9 from the application of FIG. 1 using plugins 150 of FIG. 4, according to embodiments of the disclosure. In FIG. 14A, at block 1405, receiver 805 of FIG. 8 may receive registration request 905 of FIG. 9 from the system administrator on machine 105 of FIG. 1. At block 1410, framework 145 of FIG. 1 may register plugin 150 of FIG. 1.

At block 1305, receiver 805 of FIG. 8 may receive service request 915-1 of FIG. 9 from application 405 of FIG. 4. At block 1310, plugin selector 810 of FIG. 8 may select plugin 150 of FIG. 1 to process service request 915-1 of FIG. 9. At block 1315, transmitter 815 of FIG. 8 may deliver service request 915-2 of FIG. 9 to plugin 150 of FIG. 1. At block 1415, plugin 150 of FIG. 1 may deliver service request 915-2 of FIG. 9 (after processing into a form acceptable to device driver 130 and/or the associated module (which may be, for example, storage device 120 of FIG. 1 and/or computational device 135 of FIG. 1).

At block 1420 (FIG. 14B), plugin 150 of FIG. 1 may receive the result of service request 915-2 of FIG. 9 as executed by the associated module. At block 1320, receiver 805 of FIG. 8 may receive service response 920-1 of FIG. 9 from plugin 150 of FIG. 1. At block 1325, transmitter 815 of FIG. 8 may transmit service response 920-2 of FIG. 9 to application 405 of FIG. 4. Processing may then optionally return to block 1305 of FIG. 14A to process more service requests 915-1 of FIG. 9.

At block 1425, receiver 805 of FIG. 8 may receive deregistration request 925 of FIG. 9 from the system administrator on machine 105 of FIG. 1. At block 1430, framework 145 of FIG. 1 may deregister plugin 150 of FIG. 1.

Figure 15:
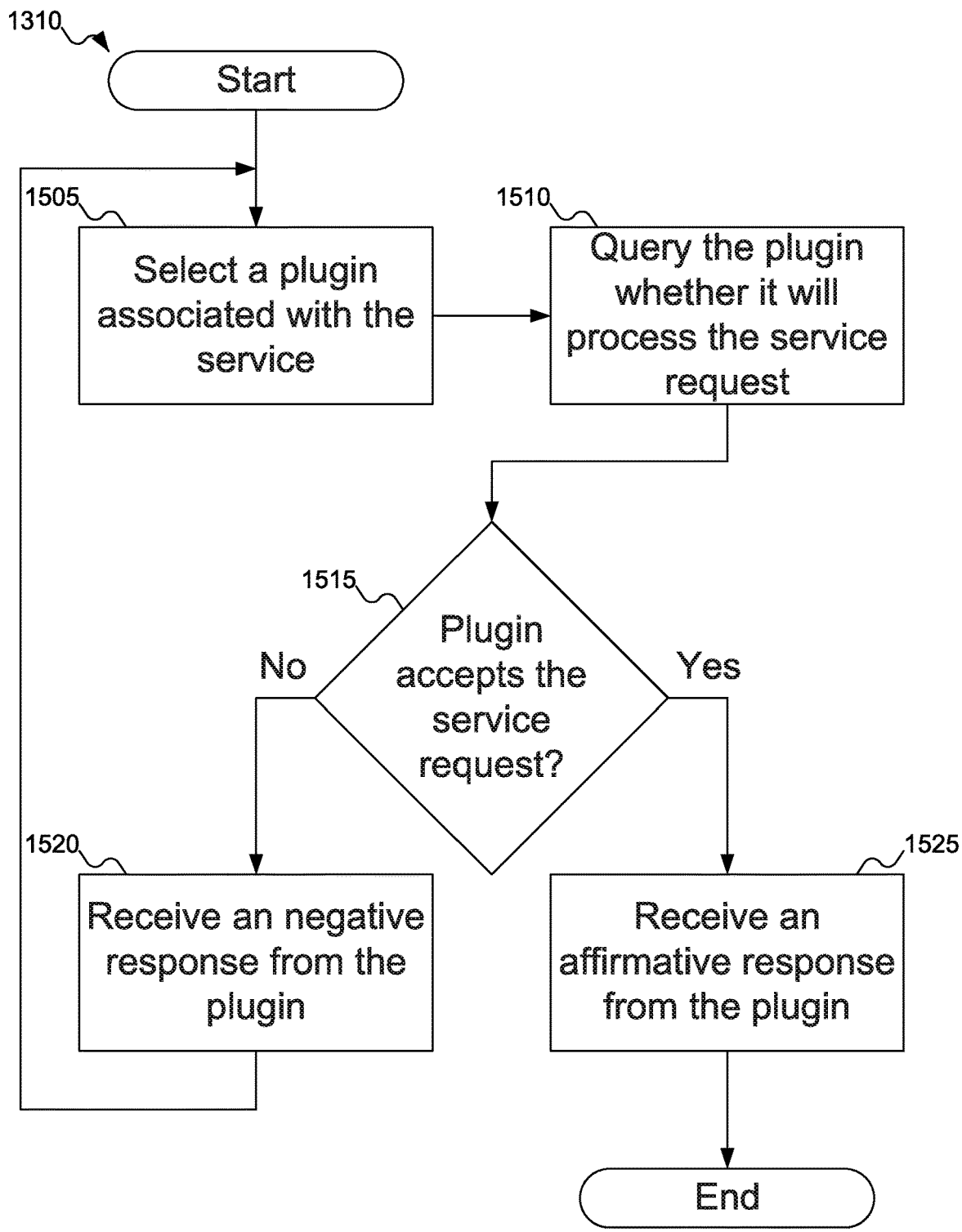
FIG. 15 shows a flowchart of an example procedure for the framework of FIG. 1 to identify the plugin of FIG. 1 as capable of processing the service request of FIG. 9 from the application of FIG. 4, according to embodiments of the disclosure.

FIG. 15 shows a flowchart of an example procedure for framework 145 of FIG. 1 to identify plugin 150 of FIG. 1 as capable of processing service request 915-1 of FIG. 9 from the application of FIG. 4, according to embodiments of the disclosure. At block 1505, plugin selector 810 of FIG. 8 may select plugin 150 of FIG. 1 associated with the service requested in service request 915-1 of FIG. 9. At block 1510, plugin selector 810 of FIG. 8 may send query 1105 or 1115 of FIG. 11 to plugin 150 of FIG. 1. At block 1515, plugin 150 of FIG. 1 may decide whether to accept or reject the request. If plugin 150 of FIG. 1 rejects the request, then at block 1520 plugin selector 810 of FIG. 8 may receive negative response 1110 of FIG. 11 from plugin 150 of FIG. 1, and processing may return to block 1505 to select another plugin 150 of FIG. 1 to query. If plugin 150 of FIG. 1 accepts the request, then at block 1525 plugin selector 810 of FIG. 8 may receive affirmative response 1120 of FIG. 11, and plugin selector 810 of FIG. 8 may select plugin 150 of FIG. 1 to process service request 915-1 of FIG. 1.

Note that blocks 1505-1520 might result in an endless loop, if no plugin 150 of FIG. 1 accepts query 1105 or 1115 of FIG. 11 One solution to avoid this endless loop is for block 1505 to be modified so that plugin selector 805 of FIG. 8 selects plugins 150 of FIG. 1 that have not been selected before for query 1105 or 1115 of FIG. 11. That is, if plugin 105 of FIG. 1 has previously issued negative response 1110 of FIG. 11, then plugin selector 805 of FIG. 8 may avoid selecting plugin 105 of FIG. 1 again for query 1105 or 1115 of FIG. 11.

Figure 16:
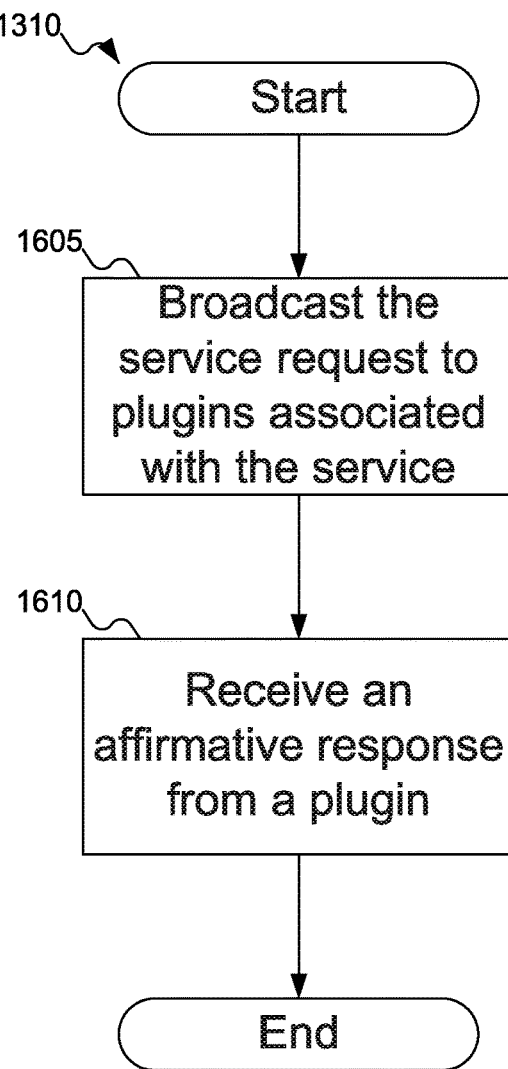
FIG. 16 shows a flowchart of another example procedure for the framework of FIG. 1 to identify the plugin of FIG. 1 as capable of processing the service request of FIG. 9 from the application of FIG. 4, according to embodiments of the disclosure.

FIG. 16 shows a flowchart of another example procedure for framework 145 of FIG. 1 to identify plugin 150 of FIG. 1 as capable of processing service request 915-1 of FIG. 9 from the application of FIG. 4, according to embodiments of the disclosure. In FIG. 16, at block 1605, plugin selector 810 of FIG. 8 may broadcast/multicast to all plugins 150 mapped from the requested service that service request 915-1 of FIG. 9 has been received. At block 1610, plugin selector 810 of FIG. 8 may receive affirmative response 1120 of FIG. 11 from plugin 150 of FIG. 1, at which point plugin 150 of FIG. 1 may be selected (and negative responses 1110 of FIG. 11 received from other plugins 150 of FIG. 1 may be ignored, since such plugins 150 of FIG. 1 might not accept service request 915-1 of FIG. 9).

In FIGS. 12A-16, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Computational Storage (CS) devices, such as computational device 135 of FIG. 1, may be derived from different offloads. For example, CS devices may include Field Programmable Gate Arrays (FPGAs), dedicated hardware Application-Specific Integrated Circuits (ASICs), embedded Central Processing units (CPUs) (which may implement Advanced Reduced Instruction Set Computing (RISC) Machines (ARM), RISC and its variations, and/or x86 architectures, among other possibilities), Graphics Processing Units (GPUs), etc. There may be different types of CS devices: despite using the term "storage", not all CS devices may provide storage. For example, an FPGA in isolation may be a CS device but not include storage that may be directly used by an application. Some CS devices may include abstractions, such as a Berkeley Packet Filter (BPF) or containers. Such CS devices, even though lacking their own host-accessible storage, may interface with storage devices and filesystems to provide near storage compute benefits. CS devices may also be direct attached (for example, connected to the host processor via a bus such as a Peripheral Component Interconnect Express (PCIe) bus), or network attached via a fabric (such as Ethernet, Fibre Channel, InfiniBand, etc.).

These variations—CS devices with or without storage, with or without abstractions, directly attached or network attached—may introduce complexities that may impact how applications running on the host processor may access the CS devices.

Embodiments of the disclosure may define a plugin framework mechanism (which may be termed a framework, such as framework 145 of FIG. 1) in the Application Programming Interface (API) library. The plugin framework may offer a layered architecture, may be transparent to the host, may seamlessly interface with the API library, and may define plugin interface methods and methods for interfacing between plugins, such as plugin 150 of FIG. 1.

The plugin framework 145 of FIG. 1 may provide abstract mechanisms for transport (Non-Volatile Memory Express (NVMe), NVMe over Fabrics (NVMe-oF), or other fabric attached devices), computation resources (CPU, FPGA, ASIC, GPU, etc.), and storage (filesystem, block, object, etc.). The plugin framework may support featured offloads, such as BPF, io_uring, containers, etc. The plugin framework may also abstract kernel-space/user-space models and/or virtual devices.

CS technology may be applied to different classes of devices. While individual CS devices may have APIs that may provide a uniform and generic interface to the individual device, an underlying mechanism to support access to CS devices is beneficial. Plugins, such as plugin 150 of FIG. 1, may be one such mechanism to help in these translations.

Embodiments of the disclosure may define a plugin framework mechanism, such as framework 145 of FIG. 1, that interfaces with the API library. The plugin framework may provide the ability to register/deregister plugins. The plugin framework may seamlessly interface with the API library/libraries. The plugin framework may be transparent to the host. The plugin framework may define plugin interface methods and methods for interfacing between plugins.

The plugin framework, such as framework 145 of FIG. 1, may offer a layered architecture. Each layer may connect to other layers by interfaces. Each module/plug-in may expose an interface to support use via the API and/or to support connections to other layers.

The plugin framework, such as framework 145 of FIG. 1, may define mechanisms to abstract. These mechanisms may include transport, computation, and/or storage. These mechanisms may also include offloads, such as BPF, io_uring, containers, and others. These mechanisms may also abstract kernel-space/user-space models, and provide for a host plugin.

The plugin framework, such as framework 145 of FIG. 1, may define abstracted usage model across CS device types, and may provide a catch-all solution to support device limitations.

Embodiments of the disclosure may use the plugin framework, such as framework 145 of FIG. 1, to hide different transports through plugins. Some abstractions may be implicit: for example, direct PCIe, NVMe, and NVMe-oF, among others. Other abstractions may be explicit: for example, network fabrics such as Remote Direct Memory Access (RDMA), Transmission Control Protocol (TCP), Fibre Channel (FC), and InfiniBand (IB), among others. As a result, for example, an FPGA may be hidden behind a network through a network plugin.

The compute plugin, such as plugin 150 of FIG. 1, may interface with a generic network or provide its own network.

This abstraction may provide a seamless experience to the user. The user does not have to worry about network attachment specifics. In establishing the abstractions, a hint may be provided during Discovery of the CS devices.

Embodiments of the disclosure may support plugins, such as plugin 150 of FIG. 1, to handle different compute types. For example, FPGAs, NVMe CS devices, embedded CPUs, etc., may be accessed through different plugins.

The plugin framework, such as framework 145 of FIG. 1, may help to abstract APIs over different device implementations through plugins. Device-specific handling may be hidden in the plugins.

One plugin may utilize other plugins for some work.

Embodiments of the disclosure may support plugins, such as plugin 150 of FIG. 1, that may provide storage abstraction by handling I/O by file, block, key-value (KV), object, streams, etc. Since the plugins may hide the details, the plugin framework may be extensible to support other types of storage access, including custom file system services.

The plugin framework, such as framework 145 of FIG. 1, may shuffle the request till a plugin accepts. The plugin framework may cache the acceptor as an optimization for later requests.

Plugins, such as plugin 150 of FIG. 1, may handle host visible and opaque device memories. Plugins may provide translations from file to block (or between other storage access forms, as appropriate) when needed.

Embodiments of the disclosure may permit applications, such as application 405 of FIG. 4, to write to CS APIs. Because the APIs may access the plugins, the plugin framework may provide a consistent user experience. The applications may avoid being modified when the underlying hardware changes. Similarly, the plugin framework may avoid exposing local and remote attach requirements.

Certain usages of the plugin framework, such as framework 145 of FIG. 1, may expect applications to be portable, either across hardware or where there is no hardware. A software plugin may provide a device abstraction when hardware is absent, enabling portability.

Embodiments of the disclosure may permit specific compute features that may be abstracted through plugins, such as plugin 150 of FIG. 1. For example, a plugin used to communicate with a particular CS device may hide feature-specific details from the main plugin. The plugin framework may compensate for device limitations, and may serve as a catch-all for changing technology/definitions.

As an example, a BPF plugin may abstract following paths. The BPF plugin may download BPF programs, provide memory and map abstractions, and may support program execution and parameter setup. This configuration may enhance download options at API level: for example, by integrating BPF tools. This configuration may also enhance device implementation options.

Plugins, such as plugin 150 of FIG. 1, may enable additional features and functionality. Plugins may register with the framework. They may describe their type and interface functions. They may expose methods callable by other plugins.

To support plugins, the CS APIs may include various functions, such as csQueryLibrarySupport( ), csQueryPlugin( ), csRegisterPlugin( ), and csDeregisterPlugin( ), as well as other functions (other names for these functions may be used without limitation).

The plugin framework, such as framework 145 of FIG. 1, may provide a seamless interface between local & remote attached CS devices.

The plugin framework, such as framework 145 of FIG. 1, may provide consistent interface when library/framework is used in different environments. For example, the plugin framework may support a user library frame with kernel drivers, a user library with user space drivers (SPDK), and/or a kernel library with kernel drivers. The plugin framework may include definitions to seamlessly abstract BPF technology (or other feature services) outside transport.

Embodiments of the disclosure offer technical advantages over the prior art. By using plugins and a framework, details associated with the actual hardware may be abstracted away from applications and the framework. Applications may issue Application Programming Interface (API) calls using a standardized structure. The framework may then identify a plugin to process the request based on the request service. The framework, like the application, does not have to know or understand which hardware may execute the request or even how to communicate with that hardware: the plugin may handle the mechanics of translating the API call and its associated data into a request that may be processed by the hardware.

The use of the framework and plugins may abstract away the type of hardware-embedded central processing unit (CPU), graphics processing unit (GPU), Field Programmable Gate Array (FPGA), Application-Specific Integrated Circuit (ASIC), etc.—that may execute the request, the transport used for communicating with the hardware, the fabric used to communicate with the hardware, whether the hardware is local or remote, the form a storage request—block, key-value, object, etc.—may take, the availability of particular features, the user space/kernel space model used by the operating system, and even the presence of virtual devices. In addition, a host level abstraction plugin may be available to implement, using a host processor, a software service that might be offered by hardware not currently available in the system.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
  a processor;
  a storage device;
  a computational device;
  a plugin associated with a service on the computational device; and
  a framework implemented in software and configured to be executed on the processor, the framework including:
    a receiver to receive a service request from an application configured to be executed on the processor and a service response from the plugin, the service request identifying a service requested by the application;
    a plugin selector to select the plugin based at least in part on the service; and
    a transmitter to deliver the service request to the plugin and the service response to the application,
  wherein the application is agnostic to the plugin and the computational device.

Statement 2. An embodiment of the disclosure includes the system according to statement 1, wherein the plugin is configured to deliver the service request to the computational device and to receive the service response from the computational device.

Statement 3. An embodiment of the disclosure includes the system according to statement 1, wherein the application is agnostic to a transport protocol used to deliver the service request from the plugin to the computational device.

Statement 4. An embodiment of the disclosure includes the system according to statement 1, wherein the plugin represents a transport protocol used by the plugin to communicate with the computational device.

Statement 5. An embodiment of the disclosure includes the system according to statement 1, wherein the plugin represents a fabric used to communicate with the computational device.

Statement 6. An embodiment of the disclosure includes the system according to statement 1, wherein the plugin represents the hardware implementation of the computational device.

Statement 7. An embodiment of the disclosure includes the system according to statement 1, wherein the plugin represents a storage mechanism used by the computational device.

Statement 8. An embodiment of the disclosure includes the system according to statement 1, wherein the plugin supports a feature that complements a second plugin associated with the computational device.

Statement 9. An embodiment of the disclosure includes the system according to statement 1, wherein the plugin selector is configured to select the plugin from at least the plugin and a second plugin.

Statement 10. An embodiment of the disclosure includes the system according to statement 9, wherein the plugin selector is configured to select the plugin from at least the plugin and the second plugin based at least in part on the plugin and the second plugin being associated with the service.

Statement 11. An embodiment of the disclosure includes the system according to statement 9, wherein the plugin selector is configured to select the second plugin to process the service request, query the second plugin based at least in part on the service, receive a negative response from the second plugin, query the plugin to process the service request, and receive an affirmative response from the plugin.

Statement 12. An embodiment of the disclosure includes the system according to statement 1, wherein the plugin selector is configured to broadcast the service request to the plugin and the second plugin and receiving an affirmative response from the plugin.

Statement 13. An embodiment of the disclosure includes the system according to statement 1, wherein the framework is configured to register the plugin based at least in part on the receive receiving a registration request for the plugin.

Statement 14. An embodiment of the disclosure includes the system according to statement 13, wherein the framework is further configured to deregister the plugin based at least in part on the receive receiving a deregistration request for the plugin.

Statement 15. An embodiment of the disclosure includes a method, comprising:
  receiving a service request from an application running on a host at a framework on the host, the service request identifying a service requested by the application;
  identifying a plugin to process the service request, the plugin associated with the service on a computational device, the computational device associated with a storage device;
  delivering the service request from the framework to the plugin;
  receiving a service response from the plugin at the framework; and
  delivering the service response from the framework to the application,
  wherein the application is agnostic to the plugin and the computation storage unit.

Statement 16. An embodiment of the disclosure includes the method according to statement 15, further comprising:
  delivering the service request from the plugin to the computational device; and
  receiving the service response from the computational device at the plugin.

Statement 17. An embodiment of the disclosure includes the method according to statement 15, wherein the application is agnostic to a transport protocol used to deliver the service request from the plugin to the computational device.

Statement 18. An embodiment of the disclosure includes the method according to statement 15, wherein the plugin represents a transport protocol used by the plugin to communicate with the computational device.

Statement 19. An embodiment of the disclosure includes the method according to statement 15, wherein the plugin represents a fabric used to communicate with the computational device.

Statement 20. An embodiment of the disclosure includes the method according to statement 15, wherein the plugin represents the hardware implementation of the computational device.

Statement 21. An embodiment of the disclosure includes the method according to statement 15, wherein the plugin represents a storage mechanism used by the computational device.

Statement 22. An embodiment of the disclosure includes the method according to statement 15, wherein the plugin supports feature that complements a second plugin associated with the computational device.

Statement 23. An embodiment of the disclosure includes the method according to statement 15, wherein identifying the plugin to process the service request includes selecting the plugin from at least the plugin and a second plugin.

Statement 24. An embodiment of the disclosure includes the method according to statement 23, wherein selecting the plugin from at least the plugin and the second plugin includes selecting the plugin from at least the plugin and the second plugin based at least in part on the plugin and the second plugin being associated with the service.

Statement 25. An embodiment of the disclosure includes the method according to statement 23, wherein selecting the plugin from at least the plugin and the second plugin includes:
  selecting the second plugin to process the service request;
  querying the second plugin based at least in part on the service;
  receiving a negative response from the second plugin;
  querying the plugin to process the service request; and
  receiving an affirmative response from the plugin.

Statement 26. An embodiment of the disclosure includes the method according to statement 15, wherein selecting the plugin from at least the plugin and the second plugin includes:
  broadcasting the service request to the plugin and the second plugin; and
  receiving an affirmative response from the plugin.

Statement 27. An embodiment of the disclosure includes the method according to statement 15, further comprising:
  receiving at the framework on the host a registration request for the plugin;
  registering the plugin with the framework on the host.

Statement 28. An embodiment of the disclosure includes the method according to statement 27, further comprising:
  receiving at the framework on the host a deregistration request for the plugin; and
  deregistering the plugin with the framework on the host.

Statement 29. An embodiment of the disclosure includes an article, comprising a non-transitory storage medium, the non-transitory storage medium having stored thereon instructions that, when executed by a machine, result in:
  receiving a service request from an application running on a host at a framework on the host, the service request identifying a service requested by the application;
  identifying a plugin to process the service request, the plugin associated with the service on a computational device, the computational device associated with a storage device;
  delivering the service request from the framework to the plugin;
  receiving a service response from the plugin at the framework; and
  delivering the service response from the framework to the application,
  wherein the application is agnostic to the plugin and the computation storage unit.

Statement 30. An embodiment of the disclosure includes the article according to statement 29, the non-transitory storage medium having stored thereon further instructions that, when executed by the machine, result in:
  delivering the service request from the plugin to the computational device; and receiving the service response from the computational device at the plugin.

Statement 31. An embodiment of the disclosure includes the article according to statement 29, wherein the application is agnostic to a transport protocol used to deliver the service request from the plugin to the computational device.

Statement 32. An embodiment of the disclosure includes the article according to statement 29, wherein the plugin represents a transport protocol used by the plugin to communicate with the computational device.

Statement 33. An embodiment of the disclosure includes the article according to statement 29, wherein the plugin represents a fabric used to communicate with the computational device.

Statement 34. An embodiment of the disclosure includes the article according to statement 29, wherein the plugin represents the hardware implementation of the computational device.

Statement 35. An embodiment of the disclosure includes the article according to statement 29, wherein the plugin represents a storage mechanism used by the computational device.

Statement 36. An embodiment of the disclosure includes the article according to statement 29, wherein the plugin supports feature that complements a second plugin associated with the computational device.

Statement 37. An embodiment of the disclosure includes the article according to statement 29, wherein identifying the plugin to process the service request includes selecting the plugin from at least the plugin and a second plugin.

Statement 38. An embodiment of the disclosure includes the article according to statement 37, wherein selecting the plugin from at least the plugin and the second plugin includes selecting the plugin from at least the plugin and the second plugin based at least in part on the plugin and the second plugin being associated with the service.

Statement 39. An embodiment of the disclosure includes the article according to statement 37, wherein selecting the plugin from at least the plugin and the second plugin includes:
  selecting the second plugin to process the service request;
  querying the second plugin based at least in part on the service;
  receiving a negative response from the second plugin;
  querying the plugin to process the service request; and
  receiving an affirmative response from the plugin.

Statement 40. An embodiment of the disclosure includes the article according to statement 29, wherein selecting the plugin from at least the plugin and the second plugin includes:
  broadcasting the service request to the plugin and the second plugin; and
  receiving an affirmative response from the plugin.

Statement 41. An embodiment of the disclosure includes the article according to statement 29, the non-transitory storage medium having stored thereon further instructions that, when executed by the machine, result in:
  receiving at the framework on the host a registration request for the plugin;
  registering the plugin with the framework on the host.

Statement 42. An embodiment of the disclosure includes the article according to statement 41, the non-transitory storage medium having stored thereon further instructions that, when executed by the machine, result in:
  receiving at the framework on the host a deregistration request for the plugin; and
  deregistering the plugin with the framework on the host.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:
  a processor;
  a storage device;
  a computational storage unit;
  a plugin associated with a service on the computational storage unit;
  a second plugin associated with a second service on the computational storage unit; and
  a framework implemented in software and configured to be executed on the processor, the framework including:
    a receiver to receive a service request from an application configured to be executed on the processor and a service response from the plugin, the service request identifying the service requested by the application;
    a plugin selector to select the plugin based at least in part on the service; and
    a transmitter to deliver the service request to the plugin for execution of the service on the computational storage unit and to deliver the service response to the application,
  wherein the application is agnostic to the plugin, the second plugin, and the computational storage unit.

2. The system according to claim 1, wherein the application is agnostic to a transport protocol used to deliver the service request from the plugin to the computational storage unit.

3. The system according to claim 1, wherein the plugin represents a transport protocol used by the plugin to communicate with the computational storage unit.

4. The system according to claim 1, wherein the plugin represents a fabric used to communicate with the computational storage unit.

5. The system according to claim 1, wherein the plugin represents the hardware implementation of the computational storage unit.

6. The system according to claim 1, wherein the plugin represents a storage mechanism used by the computational storage unit.

7. The system according to claim 1, wherein the plugin supports a feature that complements a second plugin associated with the computational storage unit, wherein a first of the plugin and a second plugin calls a second of the plugin and the second plugin.

8. The system according to claim 1, wherein the plugin selector is configured to select the plugin from at least the plugin and a second plugin.

9. A method, comprising:
  receiving a service request from an application running on a host at a framework on the host, the service request identifying a service requested by the application;
  identifying a plugin to process the service request, the plugin associated with the service on a computational storage unit, the computational storage unit associated with a storage device, the computational storage device offering a second service associated with a second plugin;
  delivering the service request from the framework to the plugin;

receiving a service response from the plugin at the framework based at least in part on the computational storage unit executing the service; and delivering the service response from the framework to the application, wherein the application is agnostic to the plugin and the computation storage unit.

10. The method according to claim 9, wherein identifying the plugin to process the service request includes selecting the plugin from at least the plugin and a second plugin.

11. The method according to claim 10, wherein selecting the plugin from at least the plugin and the second plugin includes selecting the plugin from at least the plugin and the second plugin based at least in part on the plugin and the second plugin being associated with the service.

12. The method according to claim 10, wherein selecting the plugin from at least the plugin and the second plugin includes:
selecting the second plugin to process the service request;
querying the second plugin based at least in part on the service;
receiving a negative response from the second plugin;
querying the plugin to process the service request; and
receiving an affirmative response from the plugin.

13. The method according to claim 9, further comprising:
receiving at the framework on the host a registration request for the plugin;
registering the plugin with the framework on the host.

14. The method according to claim 13, further comprising:
receiving at the framework on the host a deregistration request for the plugin; and
deregistering the plugin with the framework on the host.

15. An article, comprising a non-transitory storage medium, the non-transitory storage medium having stored thereon instructions that, when executed by a machine, result in:
receiving a service request from an application running on a host at a framework on the host, the service request identifying a service requested by the application;
identifying a plugin to process the service request, the plugin associated with the service on a computational storage unit, the computational storage unit associated with a storage device, the computational storage device offering a second service associated with a second plugin;
delivering the service request from the framework to the plugin;
receiving a service response from the plugin at the framework based at least in part on the computational storage unit executing the service; and delivering the service response from the framework to the application, wherein the application is agnostic to the plugin and the computation storage unit.

16. The article according to claim 15, wherein identifying the plugin to process the service request includes selecting the plugin from at least the plugin and a second plugin.

17. The article according to claim 16, wherein selecting the plugin from at least the plugin and the second plugin includes selecting the plugin from at least the plugin and the second plugin based at least in part on the plugin and the second plugin being associated with the service.

18. The article according to claim 16, wherein selecting the plugin from at least the plugin and the second plugin includes:
selecting the second plugin to process the service request;
querying the second plugin based at least in part on the service;
receiving a negative response from the second plugin;
querying the plugin to process the service request; and
receiving an affirmative response from the plugin.

19. The article according to claim 15, the non-transitory storage medium having stored thereon further instructions that, when executed by the machine, result in:
receiving at the framework on the host a registration request for the plugin;
registering the plugin with the framework on the host.

20. The article according to claim 19, the non-transitory storage medium having stored thereon further instructions that, when executed by the machine, result in:
receiving at the framework on the host a deregistration request for the plugin; and
deregistering the plugin with the framework on the host.

21. A system according to claim 1, wherein the application is agnostic to where a data is stored.

22. A system according to claim 1, wherein the service on the computational storage unit processes a first data stored on the storage device to generate a second data, the second data different from the first data.

23. The system according to claim 1, wherein:
the receiver is configured to receive a second service request from the application configured to be executed on the processor and a second service response from the second plugin, the second service request identifying the second service requested by the application;
the plugin selector is configured to select the second plugin based at least in part on the second service; and
the transmitter is configured to deliver the second service request to the second plugin for execution of the second service on the computational storage unit and to deliver the second service response to the application.

* * * * *